US011419182B2

(12) United States Patent
Han et al.

(10) Patent No.: US 11,419,182 B2
(45) Date of Patent: Aug. 16, 2022

(54) ELECTRONIC DEVICE SUPPORTING LINK SHARING AND METHOD THEREFOR

(71) Applicant: Samsung Electronics Co., Ltd, Suwon-si (KR)

(72) Inventors: Euibum Han, Suwon-si (KR); Gupil Cheong, Suwon-si (KR); Doosuk Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 16/657,996

(22) Filed: Oct. 18, 2019

(65) Prior Publication Data

US 2020/0128620 A1 Apr. 23, 2020

(30) Foreign Application Priority Data

Oct. 19, 2018 (KR) .................. 10-2018-0125358

(51) Int. Cl.
*H04B 7/00* (2006.01)
*H04W 88/04* (2009.01)
*H04W 76/14* (2018.01)
*H04W 4/20* (2018.01)
(Continued)

(52) U.S. Cl.
CPC ............. *H04W 88/04* (2013.01); *H04W 4/20* (2013.01); *H04W 4/80* (2018.02); *H04W 52/0248* (2013.01); *H04W 76/14* (2018.02)

(58) Field of Classification Search
None
See application file for complete search history.

(56) References Cited

U.S. PATENT DOCUMENTS 8,965,286 B2 * 2/2015 Palin .................... H04W 8/005
 455/41.2
9,131,334 B2  9/2015 Chang et al.
9,756,674 B2  9/2017 Noh et al.
(Continued)

FOREIGN PATENT DOCUMENTS

KR  10-2015-0099885 A  9/2015
KR  10-2016-0052105 A  5/2016
KR  10-2017-0140363 A  12/2017

OTHER PUBLICATIONS

International Search Report dated Feb. 7, 2020 in connection with International Patent Application No. PCT/KR2019/013457, 3 pages.

*Primary Examiner* — Sithu Ko

(57) ABSTRACT

An electronic device including a user interface, at least one wireless communication circuit, a processor, and a memory connected to the processor. The memory may store instructions that, when executed, cause the processor to transmit and/or receive data to and/or from a first external electronic device through the wireless communication circuit, to search for a second external electronic device positioned at a periphery of the electronic device, to transmit at least part of connection information with the first external electronic device to the second external electronic device, and to receive data from the first external electronic device and/or the second external electronic device based on a user input via the user interface, an occurrence of an event at the electronic device, a request of the first external electronic device, or an occurrence of an event at the first external electronic device.

10 Claims, 17 Drawing Sheets

(51) Int. Cl.
*H04W 52/02* (2009.01)
*H04W 4/80* (2018.01)

(56) References Cited

U.S. PATENT DOCUMENTS

| | | | |
|---|---|---|---|
| 9,832,598 B2 * | 11/2017 | Kao | G06F 21/85 |
| 9,913,079 B2 | 3/2018 | Srivatsa et al. | |
| 9,930,240 B2 * | 3/2018 | Song | H04N 5/23206 |
| 10,064,030 B2 | 8/2018 | Park et al. | |
| 10,798,548 B2 * | 10/2020 | Choi | H04L 47/20 |
| 10,891,248 B2 * | 1/2021 | Li | H04B 1/713 |
| 10,938,442 B2 * | 3/2021 | Poletti | H04B 1/715 |
| 2012/0052802 A1 * | 3/2012 | Kasslin | H04W 48/12 |
| | | | 455/41.2 |
| 2013/0288604 A1 | 10/2013 | Chang et al. | |
| 2013/0311694 A1 * | 11/2013 | Bhamidipati | H04M 1/72412 |
| | | | 710/303 |
| 2014/0220894 A1 * | 8/2014 | Chen | H04W 12/50 |
| | | | 455/41.2 |
| 2015/0065052 A1 * | 3/2015 | Heo | H04L 67/36 |
| | | | 455/41.2 |
| 2015/0351143 A1 * | 12/2015 | Seymour | H04M 1/72412 |
| | | | 455/41.2 |
| 2017/0223579 A1 | 8/2017 | Lee et al. | |
| 2017/0223615 A1 * | 8/2017 | Lee | H04W 48/14 |
| 2018/0152806 A1 | 5/2018 | Zhang et al. | |
| 2018/0199176 A1 * | 7/2018 | Srivatsa | H04W 12/50 |
| 2019/0320315 A1 * | 10/2019 | Kwon | H04W 76/10 |

* cited by examiner

ELECTRONIC DEVICE SUPPORTING LINK SHARING AND METHOD THEREFOR

CROSS-REFERENCE TO RELATED APPLICATION

This application is based on and claims priority under 35 U.S.C. § 119 to Korean Patent Application No. 10-2018-0125358 filed on Oct. 19, 2018 in the Korean Intellectual Property Office, the disclosure of which is incorporated by reference herein in its entirety.

BACKGROUND

1. Field

The disclosure relates to an electronic device supporting link sharing and a method therefor.

2. Description of Related Art

An electronic device may be connected to another electronic device, using various protocols. For example, the electronic device may be connected to an external electronic device, using a Bluetooth protocol (e.g., Bluetooth low energy (BLE)). The electronic device supporting the Bluetooth protocol may search for an external electronic device while operating in a pairing mode and may establish the Bluetooth connection to the found external electronic device.

A Bluetooth wireless network may support multiple connections through which a plurality of electronic devices are connected simultaneously. However, an electronic device supporting only the specific profile such as a headset may be connected to only a single external electronic device at a time. For the purpose of connecting to a new external electronic device, the electronic device needs to disconnect the connection to the already connected external electronic device and to connect to the new external electronic device.

The above information is presented as background information only to assist with an understanding of the disclosure. No determination has been made, and no assertion is made, as to whether any of the above might be applicable as prior art with regard to the disclosure.

SUMMARY

When an electronic device connected to an external electronic device using the Bluetooth protocol does not support multiple connections, the electronic device needs to perform a procedure of disconnecting the connection to the external electronic device already connected and establishing a new connection for the purpose of connecting to another external electronic device. Even though the electronic device supports the multiple connections, when the electronic device is connected to other external electronic devices of which the number is not less than the number of devices capable being supported, the electronic device needs to disconnect the connection to the external electronic device already connected to connect to a new external electronic device. When a plurality of electronic devices constitutes a Bluetooth mesh network, the electronic device fails to transmit or receive data to or from another external electronic device in the mesh network due to the temporary communication failure of one external electronic device in the mesh network. In this case, an electronic device may need to establish a new connection to communicate with another external electronic device within the mesh network.

In various embodiments of the disclosure, an electronic device may provide seamless link handover by sharing the link authority. In various embodiments of the disclosure, the electronic device may communicate with another external electronic device without a connection procedure, using the link authority.

Aspects of the disclosure are to address at least the above-mentioned problems and/or disadvantages and to provide at least the advantages described below.

In accordance with an aspect of the disclosure, an electronic device may include a user interface, at least one wireless communication circuit performing wireless communication with at least one external electronic device, a processor operatively connected to the user interface and the wireless communication circuit, and a memory operatively connected to the processor. The memory may store instructions that, when executed, cause the processor to perform communication connection with a first external electronic device through the wireless communication circuit to transmit and/or receive data, to search for a second external electronic device positioned at a periphery of the electronic device, to transmit at least part of connection information with the first external electronic device to the second external electronic device through the wireless communication circuit, and to receive data from the first external electronic device and/or the second external electronic device based on a user input via the user interface, an occurrence of an event at the electronic device, a request of the first external electronic device, or an occurrence of an event at the first external electronic device, in a state where data transmission to the first external electronic device is interrupted.

In accordance with another aspect of the disclosure, an electronic device may include at least one communication circuit, a processor operatively connected to the at least one communication circuit, and a memory operatively connected to the processor. The memory may store instructions that, when executed, cause the processor to pair a first external electronic device based on a Bluetooth protocol, using the at least one communication circuit and to transmit link information, which is associated with a connection between the electronic device and the first external electronic device and which includes information for tracking channel hopping between the electronic device and the first external electronic device, to a second external electronic device using the at least one communication circuit.

In accordance with another aspect of the disclosure, an electronic device may include at least one communication circuit, a processor operatively connected to the at least one communication circuit, and a memory operatively connected to the processor. The memory may store instructions that, when executed, cause the processor to receive link information associated with a connection between a first external electronic device and a second external electronic device from the first external electronic device, using the at least one communication circuit, to estimate channel hopping information between the first external electronic device and the second external electronic device, using the link information, and to listen to signals between the first external electronic device and the second external electronic device, using the estimated channel hopping information.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
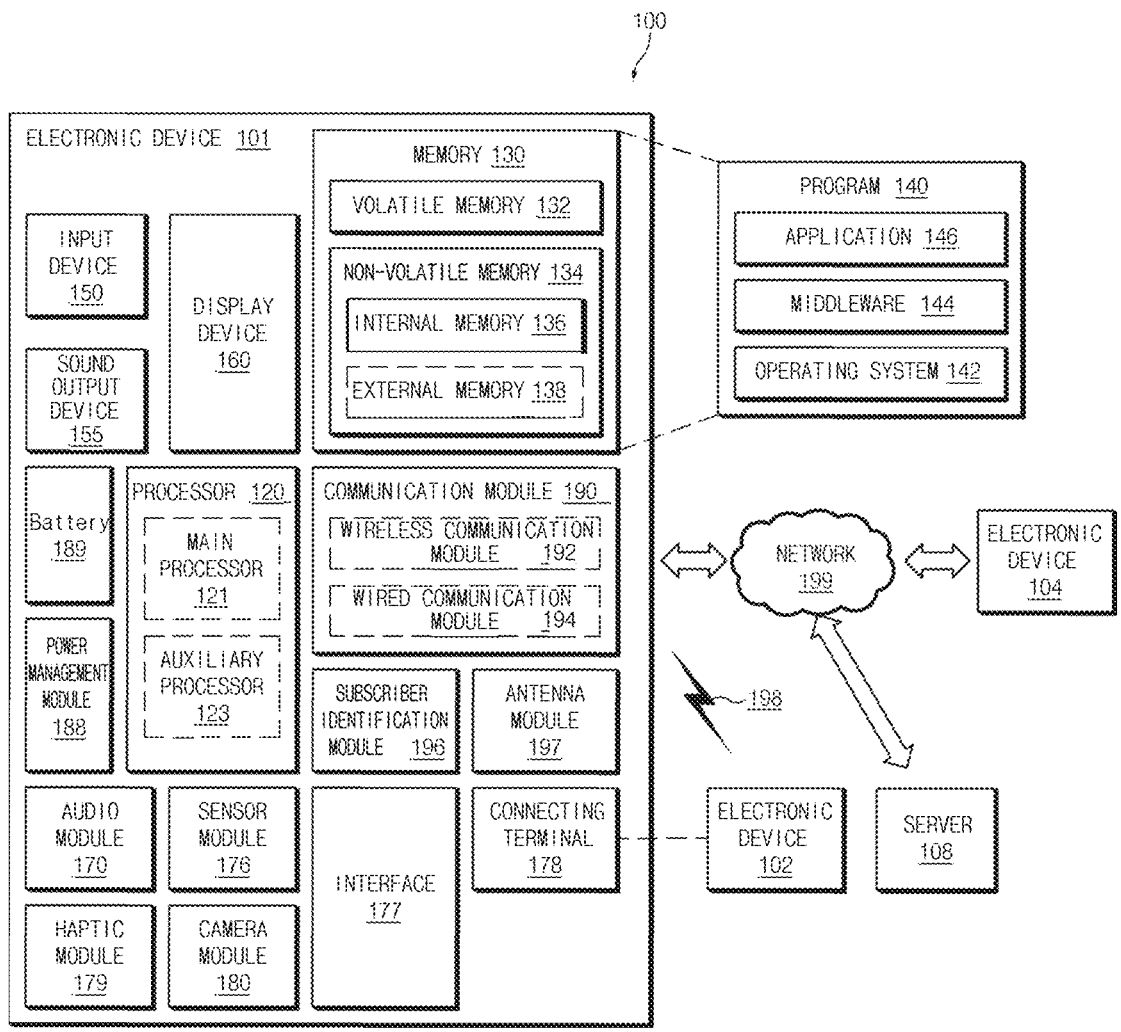
FIG. 1 illustrates a block diagram illustrating an electronic device 101 in a network environment 100 according to various embodiments.

FIG. 1 illustrates a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
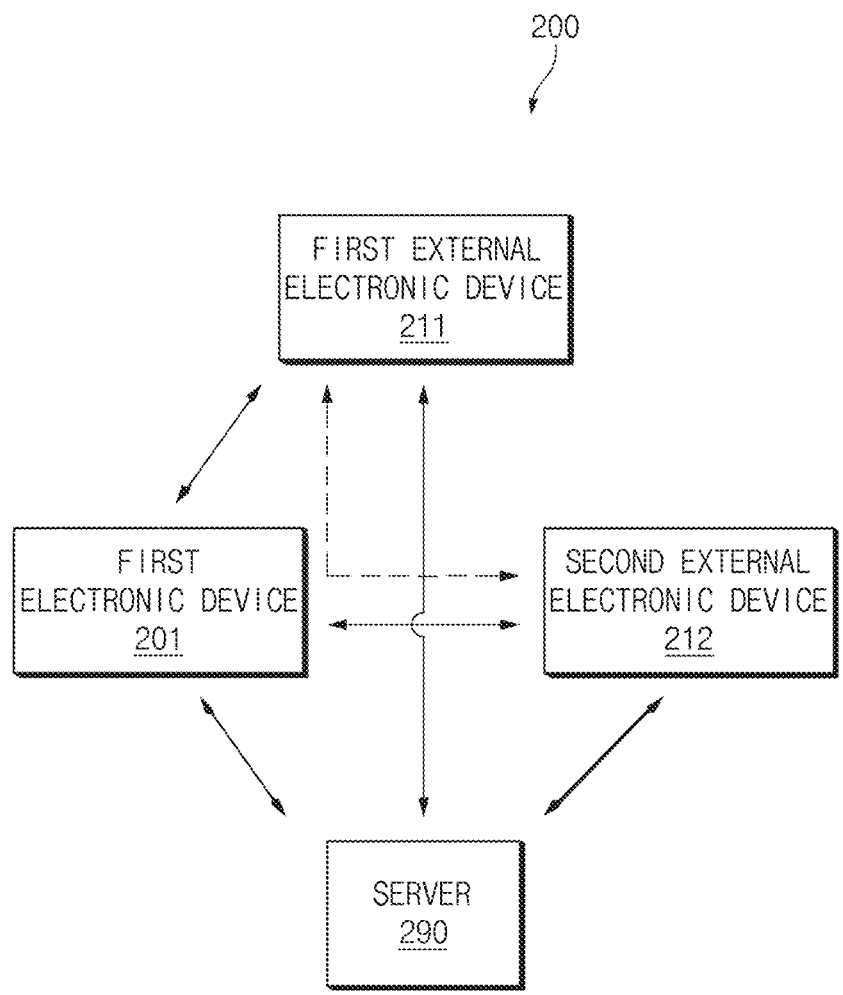
FIG. 2A illustrates communication between electronic devices in various network environments.

FIG. 2A illustrates communication between electronic devices in various network environments 200.

Referring to FIG. 2A, in the network environment 200, each of a first electronic device 201, a first external electronic device 211, and a second external electronic device 212 may be implemented as an electronic device having the similar structure to the electronic device 101 of FIG. 1. For example, each of the first electronic device 201, the first external electronic device 211, and the second external electronic device 212 may further include a component not illustrated in the electronic device 101 of FIG. 1 or may not include at least part of components of the electronic device 101 of FIG. 1.

According to various embodiments, the first electronic device 201 may be connected to the first external electronic device 211 over a wireless network (e.g., the first network 198 of FIG. 1). According to an embodiment, the first electronic device 201 may communicate with the first external electronic device 211, using the Bluetooth communication standard. Hereinafter, the Bluetooth communication standard may mean, for example, the conventional Bluetooth communication standard or a BLE communication standard. In an embodiment, the first external electronic device 211 may be an output device for media output. For example, the first external electronic device 211 may be a headphone, a speaker, TV, a headset, an audio device, and/or an image output device. For another example, the first external electronic device 211 may be a sensor device including at least one sensor. In an embodiment, the first electronic device 201 may be a portable multimedia playing device. For example, the first electronic device 201 may be a smartphone, a tablet PC, a laptop PC, a desktop PC, and/or an MP3 player.

According to various embodiments, the first electronic device 201 may communicate with the second external electronic device 212. According to an embodiment, the first electronic device 201 may communicate with the second external electronic device 212 over a wireless network (e.g., Bluetooth, Wi-Fi, 3GPP network, neighbor awareness network (NAN), or ZigBee) and/or a wired network. According to an embodiment, the first electronic device 201 and the second external electronic device 212 may communicate with a server 290 through Internet or a local network. In an embodiment, the second external electronic device 212 may be a portable multimedia playing device. For example, the second external electronic device 212 may be a smartphone, a tablet PC, a laptop PC, a desktop PC, and/or an MP3 player.

According to an embodiment, the server 290 may include a database that manages information about at least one of the first electronic device 201, the first external electronic device 211, and/or the second external electronic device 212. For example, the server 290 may include information for managing Internet of things (IoT) devices. According to an embodiment, the server 290 may store and manage information of a user account and at least one electronic device associated with the user account. For example, the user account may include the user account associated with a single user and/or group account associated with a plurality of users. For example, the user account may be associated with information about a plurality of electronic devices. For another example, the user account may be associated with a user account group including at least one user account. According to an embodiment, the server 290 may be used for data transmission between electronic devices (e.g., the first electronic device 201, the first external electronic device 211, and/or the second external electronic device 212). For example, the server 290 may transmit information updated by the first electronic device 201 or the command for controlling the external electronic device, to the first external electronic device 211 and/or the second external electronic device 212.

According to an embodiment, the user account may include information (e.g., a name, a profile, a photo, ID, and/or an e-mail address) for identifying a user; the electronic device information associated with the user account may include information (e.g., an electronic device ID, a model name, electronic device capability, and/or electronic device location information) associated with the electronic device. For example, when a plurality of users are associated with a single user account (e.g., a group account), the user account may include information for identifying a plurality of users and information of an electronic device associated with the user account. For example, the information about a plurality of electronic devices may be associated with a single user account. For example, the information about an electronic device associated with a single user account may include information about the electronic device specified by a user input or an external electronic device, which has been paired with the electronic device associated with the user account. According to an embodiment, the first electronic device 201 may determine whether the first external electronic device 211 and/or the second external electronic device 212 is an electronic device associated with the same user account as the first electronic device 201, using the electronic device information associated with the user account.

According to an embodiment, the user account group may be referred to as a group including at least one user account. The information of the user account group may include the information of the user account included in the user account group and/or information of at least one electronic device associated with each user account. For example, user account group information may be stored in the server 290 and/or the first electronic device 201. According to an embodiment, the first electronic device 201 may determine whether the first external electronic device 211 and/or the second external electronic device 212 is an electronic device associated with a user account that belongs to the user account group the same as the first electronic device 201, using the user account group information associated with the first electronic device 201.

Connection Between Electronic Devices

According to an embodiment, the first electronic device 201 may transmit or receive data through short range communication connection to the first external electronic device 211. For example, the first electronic device 201 may search for at least one external electronic device after activating a Bluetooth function to search for the first external electronic device 211. The first electronic device 201 may select the first external electronic device 211 among the found at least one external electronic device and may connect the Bluetooth communication to the first external electronic device 211.

According to an embodiment, the first electronic device 201 may search for the first external electronic device 211 by receiving an advertising signal from the first external electronic device 211. For example, the advertising signal may include at least one of identification information of the first external electronic device 211, user account information associated with the first external electronic device 211, connection information indicating the current connection state of the first external electronic device 211, a list of devices to which the first external electronic device 211 has been connected previously, multi-device connection capability information, or battery information of the first external electronic device 211.

According to an embodiment, the first electronic device 201 may connect the first electronic device 201 to the first external electronic device 211, using the received advertising signal. After connecting to the first external electronic device 211, the first electronic device 201 may transmit or receive data to or from the first external electronic device 211. For example, the first electronic device 201 may transmit media data to be played by the first external electronic device 211 to the first external electronic device 211.

According to an embodiment, the role between the first electronic device 201 and the first external electronic device 211 may be set to a master or a slave. For example, the first electronic device 201 may be set to a master device; the first external electronic device 211 may be set to a slave device. According to an embodiment, the master device and the slave device may transmit a data packet, using slots set to be different from each other with respect to the master device and the slave device. For example, the master device may transmit data to the slave device, using a specified slot with respect to the master device; and the slave device may transmit data to the master device, using a specified slot with respect to the slave device. According to an embodiment, the master device and the slave device may transmit data in a specified order. For example, after the master device transmits data to the slave device, the slave device may transmit data to the master device. For example, after the first electronic device 201 transmits all pieces of data to be transmitted, the first external electronic device 211 may transmit data.

Management of Electronic Device Information of a Server

According to an embodiment, when the first electronic device 201 is connected to the first external electronic device 211, the first electronic device 201 may transmit information associated with the first external electronic device 211 to the server 290. For example, when the first electronic device 201 is first connected to the first external electronic device 211, the first electronic device 201 may transmit information associated with the first external electronic device 211, to the server 290. For example, the information associated with the first external electronic device 211 may include at least part of the information (e.g., information included in the advertising signal of the first external electronic device 211) received from the first external electronic device 211.

According to an embodiment, the server 290 may manage user account information (e.g., first user account information) associated with the first electronic device 201, using the received information associated with the first external electronic device 211. For example, the server 290 may add the information associated with the first external electronic device 211 to first user account information or may update electronic device information (e.g., information associated with the first external electronic device 211) associated with the first user account information.

According to an embodiment, the server 290 may transmit electronic device information associated with the first user account to at least one electronic device (e.g., the first electronic device 201, the first external electronic device 211, and/or the second external electronic device 212) associated with the first user account. For example, the server 290 may transmit the electronic device information associated with the first user account, at a specified period or based on a request from the electronic device associated with the first user account.

Transmission of Connection Information

According to various embodiments, the first electronic device 201 may transmit information about the connection to the first external electronic device 211, to the second external electronic device 212 by directly transmitting the information to the second external electronic device 212 or transmitting the information to the server 290. For example, the connection information may include information for tracking the channel hopping between the first electronic device 201 and the first external electronic device 211. The connection information may include at least one of address information of the first external electronic device 211, frequency hop synchronized packet information, link key information, used channel map information, or service discovery protocol (SDP) information. For example, the address information of the first external electronic device 211 may mean Bluetooth address information composed of 6 bytes. For example, the frequency hop synchronized packet information may include information about the clock (e.g., a piconet clock) of 4 bytes and the logical transport (LT) address of 3 bits. For example, the link key information may be composed of 16 bytes; the used channel map information may be composed of 10 bytes. For example, the SDP information may include information that allows the application of a reception electronic device (e.g., the second external electronic device 212) to discover what service is available at the first external electronic device 211 and to determine the features of available services.

According to various embodiments, the first electronic device 201 may transmit, to the second external electronic device 212, information associated with electronic devices, which have been connected to the first electronic device 201, and/or information associated with the electronic device connected to the first electronic device 201 through the connection (e.g., Bluetooth connection) to the second external electronic device 212. For example, each of the information associated with the electronic devices, which have been connected thereto, and the information associated with the connected electronic device may include connection information used to connect the first electronic device 201 to another electronic device. For example, the first electronic device 201 may transmit information about the connection to the second external electronic device 212, using a link manager message used at a link manager layer. For example, the link manager may mean a function for setting (e.g., establish a link), managing (e.g., device ability query and/or power control), and/or terminating the communication channels between devices. The link manager layer may mean a logical layer associated with the link manager.

According to an embodiment, the first electronic device 201 may transmit information about the connection to the first external electronic device 211 to the second external electronic device 212 through the connection (e.g., Bluetooth connection) to the second external electronic device 212. For example, the first electronic device 201 may transmit information about the connection to the second external electronic device 212, using a link manager message used at a link manager layer. According to an embodiment, the first electronic device 201 may transmit the information about the connection to the first external electronic device 211 to the second external electronic device 212, using non-connection communication (e.g., NAN communication).

According to various embodiments, the first electronic device 201 may transmit the information about the connection to the first external electronic device 211 to the second external electronic device 212 based on a specified condition. For example, the first electronic device 201 may transmit connection information to the second external electronic device 212, directly or via the server 290. For example, the specified condition may include the reception of information of the second external electronic device 212, information of a user account associated with the second external electronic device 212, the location of the second external electronic device 212, the security state of the second external electronic device 212, and/or the condition associated with a user input.

According to an embodiment, the first electronic device 201 may transmit the information about the connection to the first external electronic device 211 based on information of the second external electronic device 212 stored in the server 290 or the first electronic device 201. For example, the first electronic device 201 may transmit connection information to the second external electronic device 212, directly or via the server 290. For example, the first electronic device 201 may obtain information of the second external electronic device 212 from the memory of the first electronic device 201 or the server 290. For example, the second external electronic device 212 may be an electronic device that belongs to a user account or a user account group, which is the same as a user account associated with the first electronic device 201. According to an embodiment, when the first electronic device 201 discovers the second external electronic device 212 belonging to a user account or a user account group, which is the same as the first electronic device 201, the first electronic device 201 may transmit connection information (e.g., information about the connection to the first external electronic device 211) to the second external electronic device 212 or the server 290. For example, the first electronic device 201 may discover the second external electronic device 212 based on Wi-Fi, Bluetooth, BLE, NAN, NFC, and/or electromagnetic (EM) detection. For example, the first electronic device 201 may directly transmit the information about the connection to the first external electronic device 211 to the second external electronic device 212 or may transmit the information about the connection to the first external electronic device 211 to the second external electronic device 212 via the server 290. According to an embodiment, the first electronic device 201 may discover the second external electronic device 212, by receiving a signal (e.g., an advertisement packet) from the second external electronic device 212 or by receiving information of the second external electronic device 212 from the server 290.

According to an embodiment, when the second external electronic device 212 is positioned within a specified distance, the first electronic device 201 may transmit connection information to the second external electronic device 212 or the server 290. For example, the first electronic device 201 may transmit connection information (e.g., information about the connection to the first external electronic device 211) to the second external electronic device 212, directly or via the server 290. For example, the first electronic device 201 may directly transmit the information about the connection to the first external electronic device 211 to the second external electronic device 212 or may transmit the information about the connection to the first external electronic device 211 to the second external electronic device 212 via the server 290. According to an embodiment, the first electronic device 201 may determine whether the second external electronic device 212 is positioned within a specified distance from the first electronic device 201, based on the strength of a signal received from the second external electronic device 212 or based on the location of the second external electronic device 212 received from the server 290. For example, the second external electronic device 212 may be an electronic device which information about the second external electronic device 212 is stored in the memory of the first electronic device 201 or the server 290, as the preset electronic device. For example, the second external electronic device 212 may be an electronic device that satisfies specified security settings. For another example, the second external electronic device 212 may be an electronic device specified by a user of the first electronic device 201 or an electronic device associated with a user account or a user account group, which is the same as the first electronic device 201.

According to an embodiment, the first electronic device 201 may transmit the information about the connection to the first external electronic device 211 to the second external electronic device 212 based on a user input, directly or via the server 290. For example, the first electronic device 201 may display a list of electronic devices (e.g., an external electronic device within a communicable range, an external electronic device belonging to the same user account, an external electronic device receiving a specified packet signal, and/or an external electronic device belonging to the same user account group) satisfying a specified condition on a display and may transmit connection information to an external electronic device (e.g., the second external electronic device 212) corresponding to a user input to the list.

According to an embodiment, the first electronic device 201 may transmit connection information (e.g., information about the connection to the first external electronic device 211) to the second external electronic device 212 based on a state of the connection to the second external electronic device 212. For example, the first electronic device 201 may transmit connection information to the second external electronic device 212, directly or via the server 290. For example, when being connected to the second external electronic device 212, the first electronic device 201 may transmit the connection information to the second external electronic device 212. For another example, when the first electronic device 201 is connected to the second external electronic device 212 and the reception signal strength from the second external electronic device 212 is not less than a specified range, the first electronic device 201 may transmit the connection information to the second external electronic device 212.

According to an embodiment, the first electronic device 201 may transmit information about the connection to the first external electronic device 211 to the second external electronic device 212 based on the signal received from the second external electronic device 212. For example, the first electronic device 201 may transmit connection information to the second external electronic device 212, directly or via the server 290. For example, when a request signal is received from the second external electronic device 212, the first electronic device 201 may transmit the connection information to the second external electronic device 212. For example, when the request signal is received from the second external electronic device 212 and the second external electronic device 212 is an electronic device belonging to the same user account or the same user account group, the first electronic device 201 may transmit the connection information to the second external electronic device 212.

According to various embodiments, the second external electronic device 212 may receive information about the connection to the first external electronic device 211 from the first electronic device 201. For example, the second external electronic device 212 may receive the connection information from the first electronic device 201, directly or via the server 290. For example, the second external electronic device 212 may receive the connection information including data in a predefined format, from the first electronic device 201 or the server 290.

According to an embodiment, the second external electronic device 212 may receive connection information between the first electronic device 201 and the first external electronic device 211, through the Bluetooth connection (e.g., Bluetooth or BLE communication) to the first electronic device 201. For example, the second external electronic device 212 may receive connection information, using a link manager message defined in a link manager layer. For another example, the connection information may be data in the form capable of being parsed by the second external electronic device 212 and may be transmitted to the second external electronic device 212 by using a serial port profile (SPP) or another profile.

According to an embodiment, the second external electronic device 212 may receive connection information between the first electronic device 201 and the first external electronic device 211 via the server 290. For example, when the user account associated with the second external electronic device 212 is the same as the user account associated with the first electronic device 201 or belongs to a user account group the same as the user account associated with the first electronic device 201, the second external electronic device 212 may receive the connection information from the server 290.

According to an embodiment, the second external electronic device 212 may receive connection information between the first electronic device 201 and the first external electronic device 211 from an access point (not illustrated). For example, when the second external electronic device 212 is connected to an access point the same as the first electronic device 201, the second external electronic device 212 may receive the connection information through the access point.

The above-described connection information receiving method of the second external electronic device 212 is exemplary; the connection information receiving method of the second external electronic device 212 is not limited thereto. The second external electronic device 212 may receive the connection information from the first electronic device 201, using various communication protocols (e.g., Wi-Fi, Bluetooth, NAN, LTE, or NFC).

Listening to Connection

According to various embodiments, the second external electronic device 212 may estimate the channel between the first electronic device 201 and the first external electronic device 211, based on the connection information between the first electronic device 201 and the first external electronic device 211. For example, the second external electronic device 212 may estimate slot information for performing the transmission between the first electronic device 201 and the first external electronic device 211, using information included in the connection information. According to an embodiment, the second external electronic device 212 may estimate the hopping channel between the first electronic device 201 and the first external electronic device 211, using the information included in the connection information. According to an embodiment, the second external electronic device 212 may identify a master device among the first electronic device 201 and the first external electronic device 211, using the frequency hop synchronized packet information included in the link information. The second external electronic device 212 may compute the hopping channel, using Bluetooth address and clock information of the identified master device. For example, the second external electronic device 212 may estimate the hopping channel depending on a Bluetooth communication standard (e.g., BLE) so as to be the same as the first electronic device 201 or the first external electronic device 211.

According to various embodiments, the second external electronic device 212 may listen to the communication between the first electronic device 201 and the first external electronic device 211, using the estimated hopping channel. For example, the second external electronic device 212 may listen to the communication by synchronizing the link between the first electronic device 201 and the first external electronic device 211. According to an embodiment, the second external electronic device 212 may listen to the packet transmitted between the first electronic device 201 and the first external electronic device 211, by opening the radio frequency receiving unit of the second external electronic device 212 depending on the hopping channel and the clock information obtained from the link information.

Empowerment

According to various embodiments, the first electronic device 201 may assign the transmission authority for the communication connection between the first electronic device 201 and the first external electronic device 211, to the second external electronic device 212. For example, the first electronic device 201 may assign the transmission authority for the communication connection between the first electronic device 201 and the first external electronic device 211 to the second external electronic device 212, by transmitting an empowerment signal to the second external electronic device 212, directly or via the server 290. For example, the empowerment signal may mean a signal that allows an electronic device (e.g., the first electronic device 201) to assign the transmission authority for the electronic device for the communication connection to an external electronic device (e.g., the first external electronic device 211) to another external electronic device (e.g., the second external electronic device 212). For example, the empowerment signal may mean a signal that allows an electronic device (e.g., the first electronic device 201) having the communication connection to an external electronic device (e.g., the first external electronic device 211) to assign the right (e.g., the right to transmit data through the corresponding connection as an electronic device) to use the corresponding communication connection as an electronic device, to an external electronic device (e.g., the second external electronic device 212).

According to an embodiment, the first electronic device 201 may transmit the empowerment signal to the second external electronic device 212 based on a user input, directly or via the server 290. For example, when a user input to allow (or request) the empowerment is received, the first electronic device 201 may transmit the empowerment signal to the second external electronic device 212.

According to an embodiment, the first electronic device 201 may transmit the empowerment signal to the second external electronic device 212 based on the proximity recognition of the second external electronic device 212, directly or via the server 290. For example, the first electronic device 201 may transmit the empowerment signal to the second external electronic device 212 based on NFC tagging. When the NFC tagging operation between the first electronic device 201 and the second external electronic device 212 is detected, the first electronic device 201 may transmit the empowerment signal to the second external electronic device 212. For another example, when the second external electronic device 212 is detected using radio frequency identification (RFID), the first electronic device 201 may transmit the empowerment signal to the second external electronic device 212. For another example, when an electromagnetic field corresponding to the second external electronic device 212 is detected, the first electronic device 201 may transmit the empowerment signal to the second external electronic device 212. For another example, when the first electronic device 201 obtains the electromagnetic signal of the second external electronic device 212, the first electronic device 201 may transmit the empowerment signal to the second external electronic device 212. For another example, when the first electronic device 201 detects an image (e.g., the shape of the second external electronic device 212 and/or a code (e.g., quick response (QR) code) associated with the second external electronic device 212) corresponding to the second external electronic device 212, using an image detection device (e.g., the camera module 180 of FIG. 1) of the first electronic device 201, the first electronic device 201 may transmit the empowerment signal to the second external electronic device 212.

According to an embodiment, the first electronic device 201 may transmit the empowerment signal to the second external electronic device 212 based on the empowerment request from the second external electronic device 212, directly or via the server 290. For example, when the empowerment request is received from the second external electronic device 212, the first electronic device 201 may provide a user with a user interface (UI) for the empowerment. When a user input corresponding to the approval of empowerment is received, the first electronic device 201 may transmit the empowerment signal to the second external electronic device 212. For example, when the empowerment request is received from the second external electronic device 212, the first electronic device 201 may provide a notification (e.g., visual, auditory, and/or tactile notification) indicating an empowerment request.

According to an embodiment, the first electronic device 201 may transmit the empowerment signal to the second external electronic device 212 based on a communication state, directly or via the server 290. For example, the first electronic device 201 may receive a signal (e.g., an empowerment request signal) including the reception strength of a signal of the first external electronic device 211 received (listened) by the second external electronic device 212, from the second external electronic device 212. The first electronic device 201 may transmit the empowerment signal to the second external electronic device 212, by comparing the reception strength of a signal of the first external electronic device 211 received by the first electronic device 201 with the reception strength of a signal of the first external electronic device received by the second external electronic device 212. For example, when the reception strength at the second external electronic device 212 is not less than the reception strength at the first electronic device 201 or when the reception strength at the second external electronic device 212 is not less than the reception strength at the first electronic device 201 by a threshold value, the first electronic device 201 may transmit the empowerment signal to the second external electronic device 212. For another example, the first electronic device 201 may transmit the empowerment signal to the second external electronic device 212 by comparing the reception signal qualities (e.g., at least one of reception signal strength, the ratio of acknowledgment (ACK)/negative ACK (NACK), a bit error rate (BER), or a packet error rate (PER)) of the first external electronic device 211 at the first electronic device 201 and the second external electronic device 212. When the reception signal quality of the second external electronic device 212 is better than the reception signal quality of the first external electronic device 211 by the threshold value, the first electronic device 201 may transmit the empowerment signal to the second external electronic device 212. For another example, when the reception signal quality of the second external electronic device 212 is not less than a specified threshold value, the first electronic device 201 may transmit the empowerment signal to the second external electronic device 212. In this case, the first electronic device 201 may receive a signal including the reception signal quality information of the second external electronic device 212 from the second external electronic device 212 and may determine whether to transmit the empowerment signal, based on the received quality information. For example, the signal including the reception signal quality information from the second external electronic device 212 may be referred to as an "empowerment request signal".

According to an embodiment, the first electronic device 201 may transmit the empowerment signal to the second external electronic device 212 based on the proximity of the second external electronic device 212, directly or via the server 290. For example, when it is determined using BLE proximity that the second external electronic device 212 is present within a specified distance from the first electronic device 201, the first electronic device 201 may transmit the empowerment signal to the second external electronic device 212. For another example, when it is determined based on short range wireless communication such as NAN communication, Wi-Fi communication, infrared communication, and/or ultrasonic communication that the second external electronic device 212 is present within a specified distance from the first electronic device 201, the first electronic device 201 may transmit the empowerment signal to the second external electronic device 212.

According to an embodiment, the first electronic device 201 may transmit the empowerment signal to the second external electronic device 212 based on a specified schedule, directly or via the server 290. For example, the first electronic device 201 may transmit the empowerment signal at a specified point in time or at a specified period.

According to an embodiment, in a situation where the first electronic device 201 and the first external electronic device 211 are already connected to each other, when the first electronic device 201 is connected to the second external electronic device 212, the first electronic device 201 may transmit the empowerment signal to the second external electronic device 212, directly or via the server 290. For example, when the first electronic device 201 is paired with the second external electronic device 212 based on a Bluetooth communication standard, the first electronic device 201 may transmit the empowerment signal to the second external electronic device 212. For example, when the authentication for the second external electronic device 212 is completed, the first electronic device 201 may transmit the empowerment signal to the second external electronic device 212.

According to an embodiment, in a situation where the first electronic device 201 and the second external electronic device 212 are already connected to each other, when the first electronic device 201 is connected to the first external electronic device 211, the first electronic device 201 may transmit the empowerment signal to the second external electronic device 212, directly or via the server 290. For example, when the first electronic device 201 is paired with the first external electronic device 211 based on the Bluetooth communication standard, the first electronic device 201 may transmit the empowerment signal to the second external electronic device 212. For example, when the authentication for the first external electronic device 211 is completed, the first electronic device 201 may transmit the empowerment signal to the second external electronic device 212.

According to an embodiment, the first electronic device 201 may transmit a link empowerment signal to the second external electronic device 212 through the Bluetooth connection, directly or via the server 290. For example, the first electronic device 201 may transmit the empowerment signal, using the link manager message defined in a link manager layer. For another example, the empowerment signal may be data in the form capable of being parsed by the second external electronic device 212 and may be transmitted to the second external electronic device 212 by using SPP or another profile.

According to an embodiment, the first electronic device 201 may transmit the empowerment signal to the second external electronic device 212 based on whether the second external electronic device 212 listens, directly or via the server 290. For example, in the case where the second external electronic device 212 listens to the link between the first electronic device 201 and the first external electronic device 211 based on the link information, when it is determined that the second external electronic device 212 listens to the link information successfully, the first electronic device 201 may transmit the empowerment signal to the second external electronic device 212. For another example, in the case where the second external electronic device 212 does not listen to the link between the first electronic device 201 and the first external electronic device 211, the first electronic device 201 may transmit the link information to the second external electronic device 212; when it is determined that the second external electronic device 212 successfully listens to the link between the first electronic device 201 and the first external electronic device 211, the first electronic device 201 may transmit the empowerment signal to the second external electronic device 212.

According to an embodiment, the first electronic device 201 may include empowerment start instant information and/or time interval information in the empowerment signal. For example, the first electronic device 201 may include clock information and/or time information indicating the instant at which the empowerment is started, in the empowerment signal. For example, the first electronic device 201 may include information about a time interval in which the empowerment is maintained, in the empowerment signal.

According to an embodiment, the first electronic device 201 may interrupt the data transmission to the first external electronic device 211, after the empowerment to the second external electronic device 212. For example, when transmitting the empowerment signal to the second external electronic device 212, the first electronic device 201 may interrupt the data transmission to the first external electronic device 211. For another example, when the empowerment signal includes the empowerment start instant information, the first electronic device 201 may interrupt the data transmission to the first external electronic device 211, from the empowerment start instant.

According to an embodiment, after the empowerment to the second external electronic device 212, the first electronic device 201 may listen to the data transmission of the second external electronic device 212 and/or the first external electronic device 211. For example, the first electronic device 201 may listen to at least part of data transmitted from the first external electronic device 211 and/or the second external electronic device 212, using information about the link with the first external electronic device 211. For example, the first electronic device 201 may listen to only the data transmission of a device corresponding to the master device to identify the change of a channel due to the change of the master device.

According to various embodiments, when receiving the empowerment signal, the second external electronic device 212 may transmit data to the first external electronic device 211 as the first electronic device 201. For example, the second external electronic device 212 may perform the data transmission to the first external electronic device 211 in the same form as data transmitted by the first electronic device 201. The first external electronic device 211 may receive data transmitted from the second external electronic device 212, as data transmitted from the first electronic device 201. When the second external electronic device 212 transmits data as the first electronic device 201, because the first external electronic device 211 recognizes the signal from the first electronic device 201 and the signal from the second external electronic device 212 as signals from the same device, the second external electronic device 212 may communicate with the first external electronic device 211 without performing the procedure of the connection (e.g., pairing) to the first external electronic device 211. According to an embodiment, the second external electronic device 212 may initiate the data transmission to the first external electronic device 211, based on the receiving of the empowerment signal from the first electronic device 201. For example, when the empowerment signal is received, the second external electronic device 212 may initiate the data transmission to the first external electronic device 211. For another example, the second external electronic device 212 may initiate the data transmission to the first external electronic device 211 at the empowerment start instant indicated by the empowerment signal.

According to an embodiment, the second external electronic device 212 may estimate a hopping channel for the link between the first external electronic device 211 and the first electronic device 201 and may transmit or receive data to or from the first external electronic device 211, using the estimated hopping channel. The second external electronic device 212 may estimate the hopping channel, based on the link information included in connection information received from the first electronic device 201.

According to an embodiment, the second external electronic device 212 may generate the access code of the first electronic device 201, using connection information and/or empowerment information. The second external electronic device 212 may transmit data including the generated access code of the first electronic device 201 to the first external electronic device 211. For example, the second external electronic device 212 may transmit data to the first external electronic device 211 as the first electronic device 201, by transmitting the data including the access code of the first electronic device 201 to the first external electronic device 211. The second external electronic device 212 may generate the access code, using the address of the master device among the first external electronic device 211 and the first electronic device 201. For example, the second external electronic device 212 may generate the access code corresponding to the link between the first electronic device 201 and the first external electronic device 211 in the method defined by the Bluetooth communication standard. According to an embodiment, the second external electronic device 212 may generate a header, using the logical transport (LT) address of the first electronic device 201 received from the first electronic device 201. The second external electronic device 212 may transmit data to the first external electronic device 211 as the first electronic device 201, by transmitting a packet including the access code and the header generated using the information of the first electronic device 201 to the first external electronic device 211.

According to an embodiment, the second external electronic device 212 may set a profile for providing the first external electronic device 211 with a service, using the information received from the first electronic device 201. For example, the second external electronic device 212 may set a profile for providing the first external electronic device 211 with a service, using the information obtained through an SDP operation with the first electronic device 201. For example, the second external electronic device 212 may set the profile of the second external electronic device 212, based on the identifier information (e.g., universally unique identifier (UUID)) of the first electronic device 201 obtained through the SDP operation to provide the same service as the first electronic device 201.

According to an embodiment, the first electronic device 201 may retrieve the authority for the link between the first electronic device 201 and the first external electronic device 211, from the second electronic device 212. For example, the first electronic device 201 may retrieve the authority for the link from the second external electronic device 212, by transmitting a signal (e.g., an empowerment return signal) indicating empowerment termination to the second external electronic device 212 directly or via the server 290. For another example, the first electronic device 201 may transmit a signal (e.g., an empowerment return signal) including data for retrieving the authority to the second external electronic device 212, using the link manager message defined in a link manager layer. For example, the data for terminating the empowerment may be data in the form capable of being parsed by the second external electronic device 212 and may be transmitted to the second external electronic device 212 by using SPP or another profile.

According to an embodiment, the first electronic device 201 may retrieve the authority, which is handed over to the second external electronic device 212, based on a specified condition. For example, the first electronic device 201 may retrieve the authority from the second external electronic device 212 based on a user input to the first electronic device 201. For another example, the first electronic device 201 may retrieve the authority from the second external electronic device 212 based at least on the communication state between the second external electronic device 212 and the first external electronic device 211. The first electronic device 201 may obtain the communication state between the second external electronic device 212 and the first external electronic device 211, by receiving information about the communication state from the second external electronic device 212 or by listening to the communication between the second external electronic device 212 and the first external electronic device 211. For another example, when a specified time expires after the empowerment, the first electronic device 201 may retrieve the authority from the second external electronic device 212.

According to an embodiment, the second external electronic device 212 may return the authority for the link between the first electronic device 201 and the first external electronic device 211, to the first electronic device 201. For example, the second external electronic device 212 may return the authority, by transmitting the empowerment return signal to the first electronic device 201 directly or via the server 290 or by transmitting a signal indicating empowerment termination. For example, the second external electronic device 212 may transmit the signal for returning the authority, using the link manager message defined in the link manager layer. For another example, the signal for returning the authority may be data in the form capable of being parsed by the first electronic device 201 and may be transmitted to the first electronic device 201 by using SPP or another profile.

According to an embodiment, the second external electronic device 212 may return the authority based on the specified condition. For example, the second external electronic device 212 may return the authority to the first electronic device 201 based on a user input to the second external electronic device 212. For another example, the second external electronic device 212 may return the authority to the first electronic device 201 based at least on the communication state between the second external electronic device 212 and the first external electronic device 211. For another example, when a specified time expires after the empowerment, the second external electronic device 212 may return the authority to the first electronic device 201.

According to various embodiments, the first electronic device 201 may initialize link empowerment to the second external electronic device 212. According to an embodiment, in the case where the first electronic device 201 listens to the communication between the first external electronic device 211 and the second external electronic device 212, when the disconnection between the first electronic device 201 and the first external electronic device 211 is identified by the first external electronic device 211 or the second external electronic device 212, the first electronic device 201 may initialize the empowerment. According to an embodiment, when information indicating the disconnection between the first electronic device 201 and the first external electronic device 211 is received from the first external electronic device 211 or the second external electronic device 212, the first electronic device 201 may initialize the empowerment. For example, when the disconnection between the first electronic device 201 and the first external electronic device 211 is identified, the first electronic device 201 may perform page scan using the Bluetooth address of the first electronic device 201 to connect to the first external electronic device 211 again. For another example, even after the first electronic device 201 initializes the empowerment for the second external electronic device 212, the first electronic device 201 may maintain the connection to the second external electronic device 212.

Figure 2B:
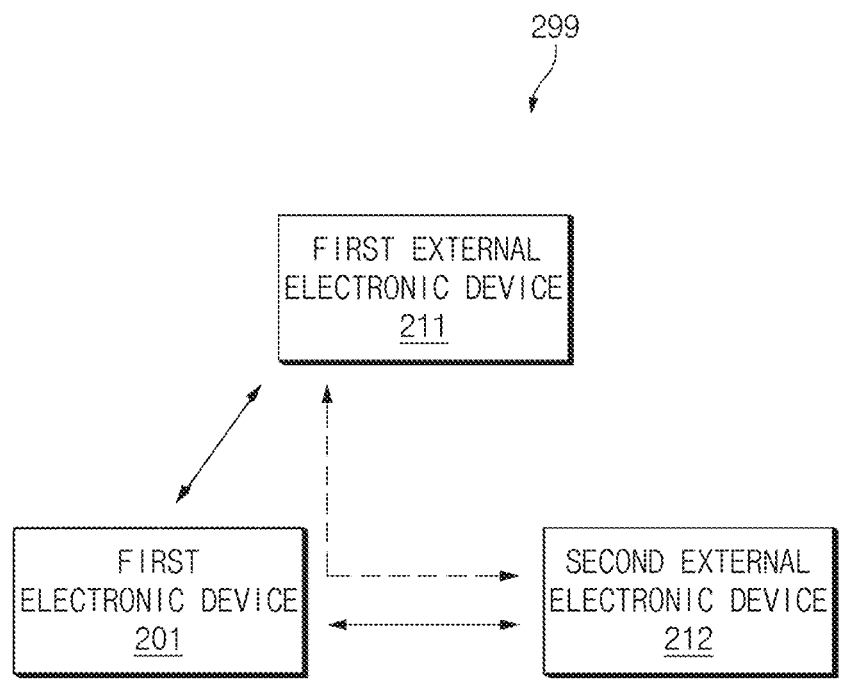
FIG. 2B illustrates communication between electronic devices in various network environments.

FIG. 2B illustrates communication between electronic devices in various network environments 299.

Hereinafter, the description overlapped with FIG. 2A may be omitted with reference to FIG. 2B for convenience of description. Unless otherwise described, the description in FIG. 2A about the configuration having the same reference numeral may be identically applied to the description in FIG. 2B.

According to various embodiments, the first electronic device 201 may include a database that manages information of the first external electronic device 211 and/or the second external electronic device 212. For example, the first electronic device 201 may store and manage the information of the user account associated with the first electronic device 201 and at least one electronic device associated with the user account. The information of the user account and an electronic device associated with the user account is not limited to being stored in the first electronic device 201.

According to various embodiments, the first electronic device 201 may transmit information about the connection to the first external electronic device 211, to the second external electronic device 212. For example, the first electronic device 201 may transmit information about the connection to the second external electronic device 212 via a wired or wireless connection. As described above, the first electronic device 201 may transmit the information about the connection to the first external electronic device 211, to the second external electronic device 212 based on the specified condition.

According to various embodiments, the second external electronic device 212 may receive information about the connection to the first external electronic device 211 from the first electronic device 201. According to an embodiment, the second external electronic device 212 may estimate the channel between the first electronic device 201 and the first external electronic device 211, based on the connection information between the first electronic device 201 and the first external electronic device 211. The second external electronic device 212 may listen to the communication between the first electronic device 201 and the first external electronic device 211, using the estimated channel.

According to various embodiments, the first electronic device 201 may assign the transmission authority for the communication connection between the first electronic device 201 and the first external electronic device 211, to the second external electronic device 212. For example, the first electronic device 201 may transmit an empowerment signal to the second external electronic device 212. For example, the first electronic device 201 may transmit a link empowerment signal to the second external electronic device 212 through the wireless connection (e.g., connection between devices, Wi-Fi direct, or Bluetooth connection) or wired connection to the first electronic device 201. According to an embodiment, the first electronic device 201 may transmit the empowerment signal to the second external electronic device 212 based on the specified condition (e.g., a user input, proximity recognition, the receiving of an empowerment request, reception strength, signal quality, proximity, a specified schedule, and/or the connection state of the second external electronic device 212). The start and end of an empowerment of FIG. 2B is as described above with reference to FIG. 2A.

Figure 3:
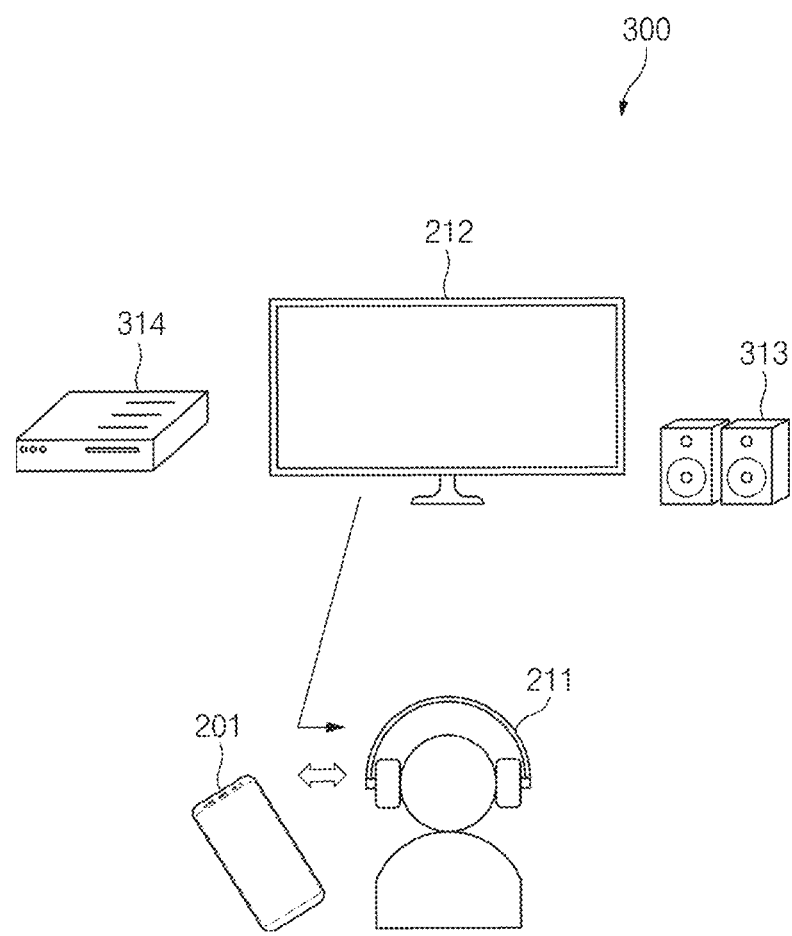
FIG. 3 illustrates a connection between electronic devices, according to an embodiment.

FIG. 3 illustrates a connection between electronic devices, according to an embodiment.

In a network environment 300 of FIG. 3, it is assumed that the first electronic device 201 is a smartphone, the first external electronic device 211 is a headphone, and the second external electronic device 212 is TV. In FIG. 3, it is assumed that a third external electronic device 313 is a speaker device having a function capable of outputting data from another electronic device It is assumed that a fourth external electronic device 314 is a multimedia device capable of transmitting data to another device.

Referring to FIG. 3, it is assumed that the first electronic device 201 is connected to the communication with the first external electronic device 211. For example, the user of the first electronic device 201 may listen to music played by the first electronic device 201, using the first external electronic device 211.

According to an embodiment, the first electronic device 201 may transmit the connection information associated with the communication connection between the first electronic device 201 and the first external electronic device 211, to the second external electronic device 212 and/or the fourth external electronic device 314. For example, the first electronic device 201 may transmit the connection information to the second external electronic device 212 and/or the fourth external electronic device 314, directly or via a server (e.g., the server 290 of FIG. 2A). The first electronic device 201 may transmit the connection information to the second external electronic device 212 based at least on the conditions (e.g., the reception of information of the second external electronic device 212, information of a user account associated with the second external electronic device 212, the location of the second external electronic device 212, the security state of the second external electronic device 212, and/or the condition associated with a user input) described with reference to FIG. 2A.

Figure 4A:
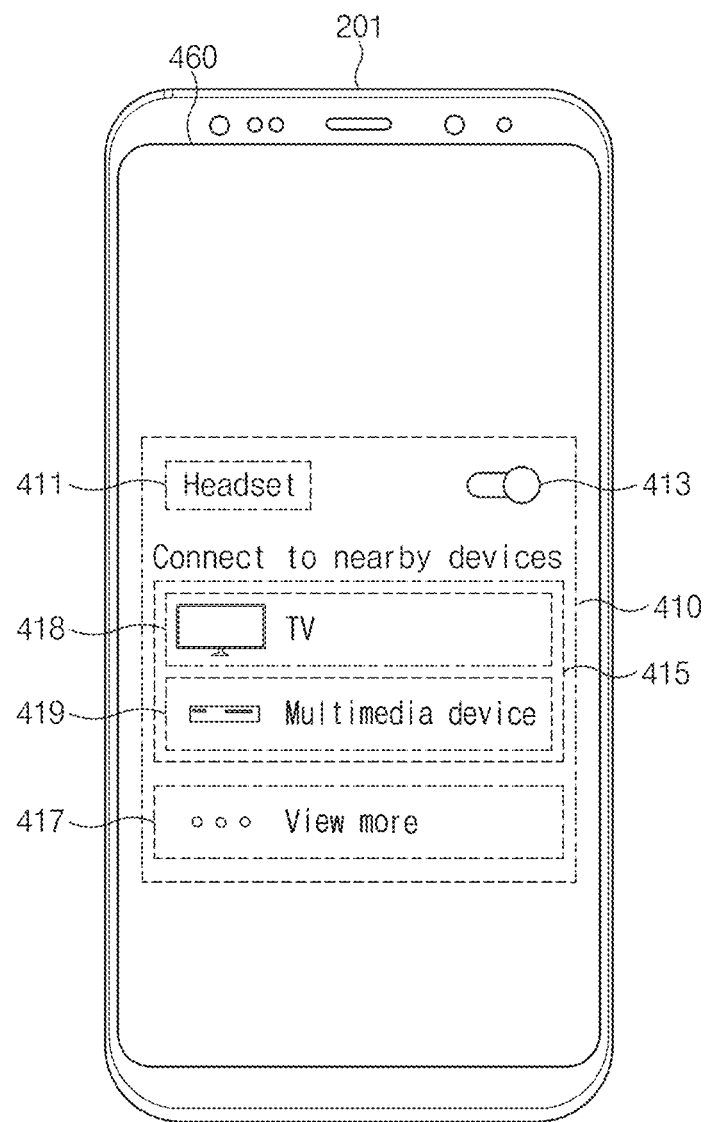
FIG. 4A illustrates an electronic device connection UI, according to an embodiment.

According to an embodiment, the first electronic device 201 may provide a user interface for transmitting a signal including connection information associated with the connection between the first electronic device 201 and the first external electronic device 211. Referring to FIG. 4A, for example, the first electronic device 201 may display an electronic device connection UI 410 on a display 460 (e.g., the display device 160 of FIG. 1). The first electronic device 201 may display the electronic device connection UI 410 based on a user input.

According to an embodiment, the first electronic device 201 may display information 411 of the device (e.g., the first external electronic device 211 of FIG. 3) currently connected within the electronic device connection UI 410 and a button 413 for the disconnection from the currently connected device. According to an embodiment, the first electronic device 201 may display a list 415 of devices capable of performing empowerment of the link with the currently connected device, on the electronic device connection UI 410. For example, the list 415 may include a TV selection UI 418 and a multimedia device selection UI 419. The electronic device connection UI 410 may include a button 417 for displaying a list of electronic devices, which are omitted in the list 415.

According to an embodiment, the first electronic device 201 may display only the electronic device, which is capable of being connected to the currently connected device, from among devices found by the first electronic device 201 on the list 415. Returning to FIG. 3, the first electronic device 201 may display only the TV selection UI 418 corresponding to the second external electronic device 212 (e.g., TV), which is capable of being connected to a headset being the first external electronic device 211, and the multimedia device selection UI 419 corresponding to the fourth external electronic device 314 (e.g., a multimedia device) among the TV being the second external electronic device 212 found by the first electronic device 201, a speaker device being the third external electronic device 313, and a multimedia device being the fourth external electronic device 314, on the list 415. For example, returning to FIG. 4A, when a user input to a single item (e.g., the TV selection UI 418) in the list 415 is received, the first electronic device 201 may transmit information about the connection to the currently connected electronic device (e.g., the first external electronic device 211 of FIG. 3), to an electronic device (e.g., the second external electronic device 212 of FIG. 3) corresponding to the item. For another example, the electronic device 101 may transmit the connection information to an electronic device capable of being connected to the currently connected device among devices found by the first electronic device 201. For example, the first electronic device 201 may transmit the connection information to electronic devices (e.g., a TV and a multimedia device) included in the list 415.

According to an embodiment, when an input to the button 417 is received, the first electronic device 201 may display information about an electronic device (e.g., the third external electronic device 313 of FIG. 3), which has been found but is not displayed on the list 415, on the electronic device connection UI 410. According to an embodiment, the first electronic device 201 may search for a connectable electronic device again based on a specified input (e.g., a specified drag input) to the electronic device connection UI 410.

The method of transmitting connection information, which is described with reference to FIG. 4A is exemplary; the method of transmitting connection information of the disclosure is not limited thereto. As described above with reference to FIGS. 2A and 2B, the first electronic device 201 may transmit the connection information based on various methods.

Returning to FIG. 3, according to an embodiment, the second external electronic device 212 and/or the fourth external electronic device 314 may listen to the communication between the first electronic device 201 and the first external electronic device 211, using the received connection information. For example, as described above with reference to FIG. 2A, the second external electronic device 212 and/or the fourth external electronic device 314 may estimate the channel between the first electronic device 201 and the first external electronic device 211 using the received connection information and may listen to the communication using the estimated channel.

According to an embodiment, the first electronic device 201 may transmit a signal including empowerment information about the connection between the first electronic device 201 and the first external electronic device 211 to the second external electronic device 212, directly or via a server (e.g., the server 290 of FIG. 2A). For example, the first electronic device 201 may transmit the signal including empowerment information to the second external electronic device 212 based on the condition (e.g., a user input, proximity recognition, the receiving of an empowerment request, reception strength, signal quality, proximity, a specified schedule, and/or the connection state of the second external electronic device 212) described above with reference to FIG. 2A.

According to an embodiment, when the second external electronic device 212 receives the link information or the empowerment signal from the first electronic device 201, the second external electronic device 212 may transmit data to the first external electronic device 211 as the first electronic device 201. For example, the second external electronic device 212 may transmit data to the first external electronic device 211, using the methods described above with regard to FIGS. 2A and 2B.

According to an embodiment, the first electronic device 201 may provide a user interface for transmitting a signal including empowerment information associated with the connection between the first electronic device 201 and the first external electronic device 211. Referring to FIG. 4A, for example, the first electronic device 201 may display the electronic device connection UI 410 on the display 460 (e.g., the display device 160 of FIG. 1).

According to an embodiment, when a user input to a single item (e.g., the TV selection UI 418) of the list 415 is received, the first electronic device 201 may transmit a signal including the empowerment information to an electronic device (e.g., the second external electronic device 212 of FIG. 2A) corresponding to the item.

According to an embodiment, when an empowerment request for the second external electronic device 212 is received from the second external electronic device 212 or a server (e.g., the server 290 of FIG. 2A), the first electronic device 201 may transmit a signal including empowerment information about the connection to the first external electronic device 211, to the second external electronic device 212 directly or via a server. For example, when a request for the empowerment to the second external electronic device 212 is received, the first electronic device 201 may provide the UI for receiving a user input and may transmit the signal including the empowerment information based on a user input.

Figure 4B:
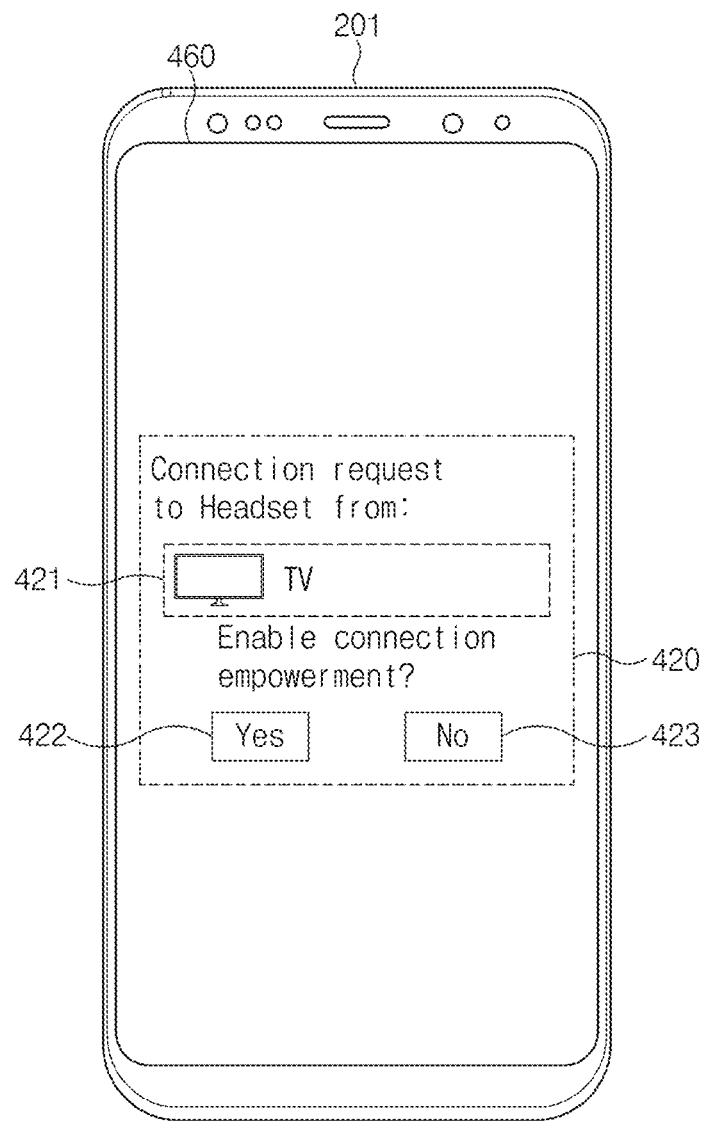
FIG. 4B illustrates an empowerment UI of an electronic device, according to an embodiment.

Referring to FIG. 4B, according to an embodiment, when the empowerment request is received, the first electronic device 201 may display an empowerment UI 420 on the display 460. For example, the empowerment UI 420 may include information 421 of a device making a request for the empowerment, a first button 422 for approving the empowerment, and/or a second button 423 for rejecting the empowerment. For example, when a user input to the first button 422 is detected, the first electronic device 201 may transmit a signal including the empowerment information, to an empowerment request device (e.g., the second external electronic device 212). For another example, when a user input to the second button 423 is detected, the first electronic device 201 may not display the empowerment UI 420 on the display 460 without transmitting the empowerment information.

Returning to FIG. 3, when the second external electronic device 212 receives a signal including link information or empowerment information from the first electronic device 201, the second external electronic device 212 may transmit data to the first external electronic device 211 as the first electronic device 201. For example, the second external electronic device 212 may transmit data to the first external electronic device 211, using the methods described above with regard to FIGS. 2A and 2B.

Figure 4C:
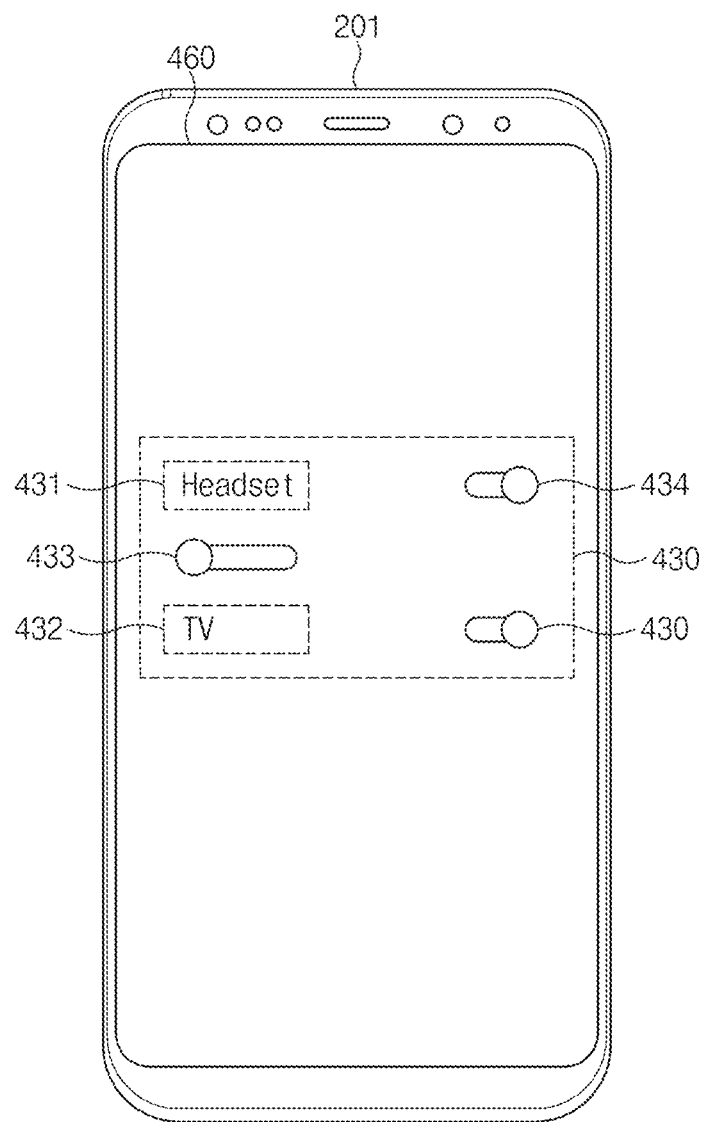
FIG. 4C illustrates a state UI of an electronic device, according to an embodiment.

Referring to FIG. 4C, according to an embodiment, the first electronic device 201 may display a state UI 430 for displaying and controlling a state of the empowerment to the second external electronic device 212, on the display 460. For example, the first electronic device 201 may be in a state where the transmission authority for the communication connection to the first external electronic device 211 is handed over to the second external electronic device 212. According to an embodiment, the state UI 430 may include the device (e.g., information 431 of a headset) corresponding to the first external electronic device 211 connected to the first electronic device 201. The state UI 430 may include information 432 of a device (e.g., TV) corresponding to the second external electronic device 212 having the authority for the connection to the first external electronic device 211. For example, the state UI 430 may include a button 434 for disconnection from the first external electronic device 211 and a button 435 for the disconnection from the second external electronic device 212. For another example, the button 435 may be omitted. According to an embodiment, the state UI 430 may include a button 433 for controlling the empowerment state and the empowerment. For example, the current state of the button 433 may indicate that the first external electronic device 211 and the second external electronic device 212 perform communication based on the empowerment. According to an embodiment, the first electronic device 201 may terminate the empowerment to the second external electronic device 212, based on the input to the button 433.

Returning to FIG. 3, according to an embodiment, the first electronic device 201 may terminate the empowerment of the second external electronic device 212. For example, after the empowerment to the second external electronic device 212, when receiving an empowerment termination request from the second external electronic device 212 directly or via a server (e.g., the server 290 of FIG. 2A), the first electronic device 201 may terminate the empowerment to the second external electronic device 212. For example, when a specified time expires after the empowerment to the second external electronic device 212, the first electronic device 201 may terminate the empowerment. For another example, the first electronic device 201 may terminate empowerment based on a user input. The first electronic device 201 may terminate empowerment based on an input to the state UI 430 described with reference to FIG. 4C. For example, the first electronic device 201 may terminate the empowerment by transmitting the empowerment termination request to the second external electronic device 212 or to the server (e.g., the server 290 of FIG. 2A). The operations for the termination of empowerment may be referred to as "operations of the first electronic device 201" described with reference to FIG. 2A.

Figure 5:
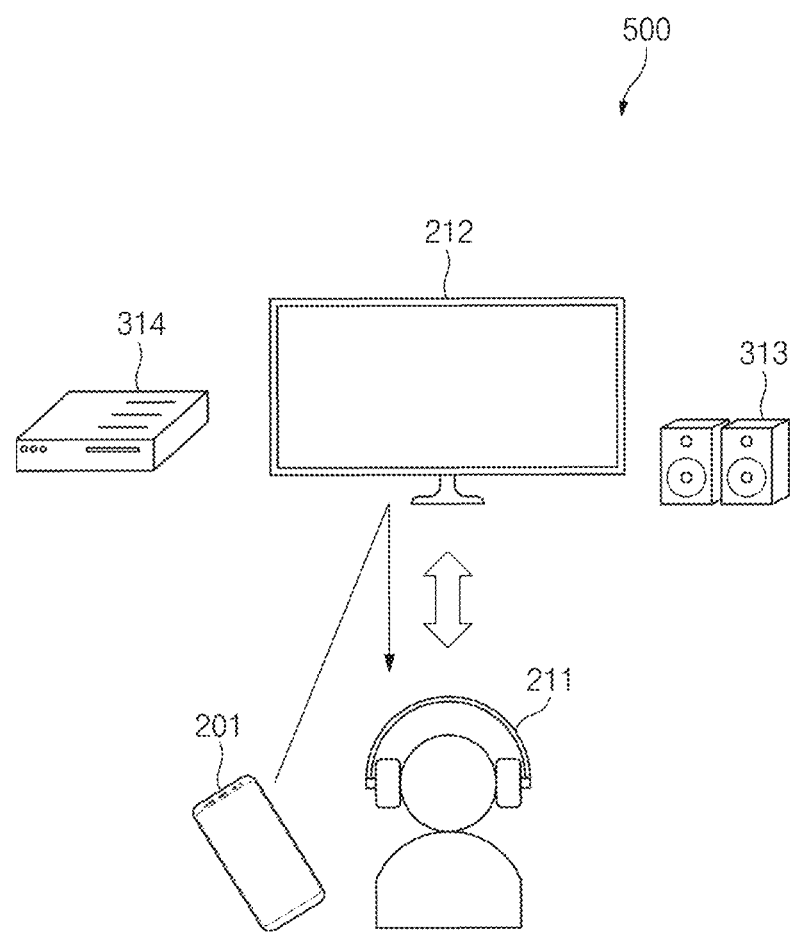
FIG. 5 illustrates a connection between electronic devices, according to an embodiment.

FIG. 5 illustrates a connection 500 between electronic devices, according to an embodiment.

The empowerment to the second external electronic device 212 for the connection between the first electronic device 201 and the first external electronic device 211 is described with reference to FIG. 3. Similarly, the first electronic device 201 may make a request for the empowerment for the communication connection between the first external electronic device 211 and the second external electronic device 212.

Referring to FIG. 5, it may be assumed that the first external electronic device 211 is communicatively connected to the second external electronic device 212. For example, the user of the first external electronic device 211 may output the sound source data from the second external electronic device 212, to the first external electronic device 211 through the Bluetooth connection to the second external electronic device 212. For example, the first electronic device 201 may receive connection information about the connection between the first external electronic device 211 and the second external electronic device 212, from the second external electronic device 212 or from a server (e.g., the server 290 of FIG. 2A).

According to various embodiments, the first electronic device 201 may transmit an empowerment request for the connection between the second external electronic device 212 and the first external electronic device 211, to the second external electronic device 212. For example, the first electronic device 201 may transmit the empowerment request to the second external electronic device 212 directly or through the server (e.g., the server 290 of FIG. 2A). When empowerment approval is received from the second external electronic device 212 directly or via a server, the first electronic device 201 may communicate with the first external electronic device 211. For example, the first electronic device 201 may communicate with the first external electronic device 211 as the second external electronic device 212, by transmitting data to the first external electronic device 211 by using the transmission authority of the second external electronic device 212.

According to an embodiment, the first electronic device 201 may transmit an empowerment request for the connection between the second external electronic device 212 and the first external electronic device 211, to the second external electronic device 212 based on a specified event. For example, when a call to the first electronic device 201 is received, the first electronic device 201 may transmit the empowerment request to the second external electronic device 212 or to the server (e.g., the server 290 of FIG. 2A). For example, when the empowerment approval is received from the second external electronic device 212 directly or via a server, the first electronic device 201 may communicate with the first external electronic device 211 as the second external electronic device 212. For another example, after transmission of the empowerment request, the first electronic device 201 may communicate with the first external electronic device 211 as the second external electronic device 212. For example, the first electronic device 201 may output data associated with a call, using the first external electronic device 211. For example, the first electronic device 201 may make a call, using the sound output by the first external electronic device 211 and data corresponding to the received sound.

According to an embodiment, the first electronic device 201 may terminate the empowerment based on a specified event. For example, when the call to the first electronic device 201 is terminated, the first electronic device 201 may terminate the empowerment. For example, the first electronic device 201 may transmit information (e.g., an empowerment return signal) indicating the termination of the empowerment to the second external electronic device 212 or to the server (e.g., the server 290 of FIG. 2A), to terminate the empowerment.

Figure 4D:
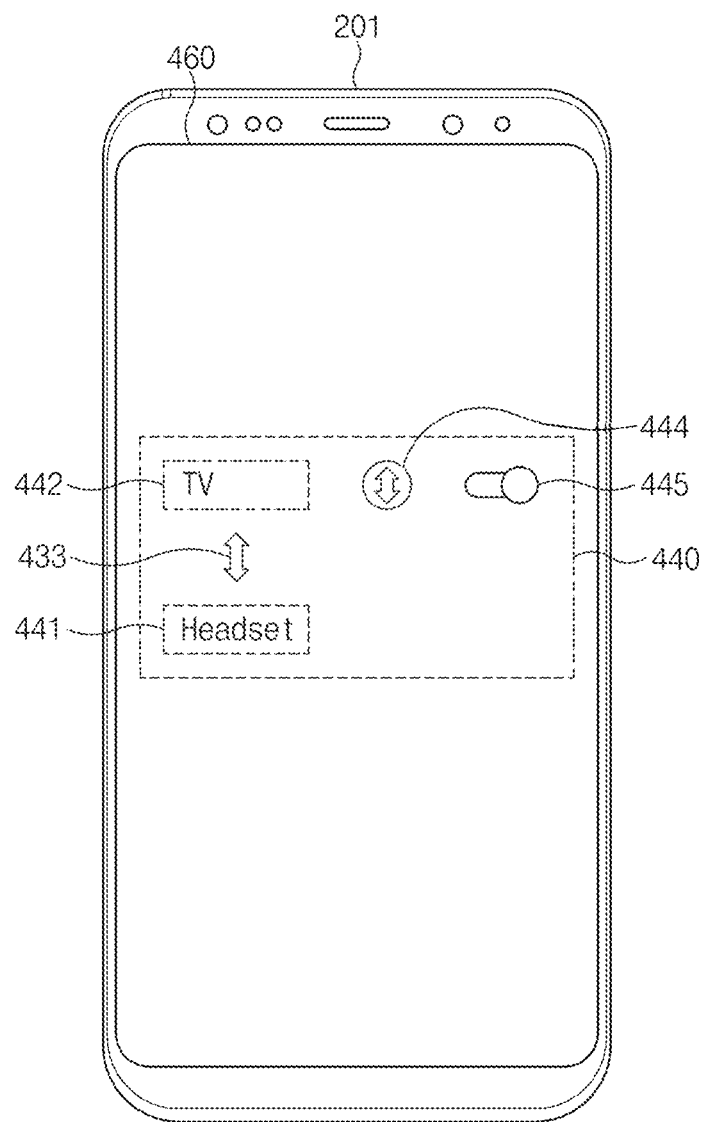
FIG. 4D illustrates an empowerment request UI of an electronic device, according to an embodiment.

According to an embodiment, the first electronic device 201 may transmit an empowerment request for the connection between the second external electronic device 212 and the first external electronic device 211, to the second external electronic device 212 based on a user input. For example, the first electronic device 201 may provide the UI for an empowerment request. Referring to FIG. 4D, according to an embodiment, the first electronic device 201 may provide an empowerment request UI 440 on the display 460.

According to an embodiment, the empowerment request UI 440 may include information 442 of the second external electronic device 212 communicatively connected to the first electronic device 201 and information 441 of the first external electronic device 211 connected to the second external electronic device 212. The empowerment request UI 440 may include connection state information 443 indicating a state where the second external electronic device 212 and the first external electronic device 211 are connected to each other. For example, the first electronic device 201 may display connection state information 443 based on the connection information received from the server (e.g., the server 290 of FIG. 2A) or the second external electronic device 212. According to an embodiment, the empowerment request UI 440 may include a button 445 for controlling (e.g., connection or disconnection) the connection to the second external electronic device 212. According to an embodiment, the empowerment request UI 440 may include the empowerment request button 444. For example, when an input to the empowerment request button 444 displayed on the empowerment request UI 440 is received, the first electronic device 201 may transmit the empowerment request for the connection between the second external electronic device 212 and the first external electronic device 211, to the second external electronic device 212.

According to an embodiment, the first electronic device 201 may display the empowerment request UI 440 as the part of the electronic device connection UI 410 of FIG. 4A. For example, the first electronic device 201 may display the empowerment request UI 440 based on a user input.

Figure 6:
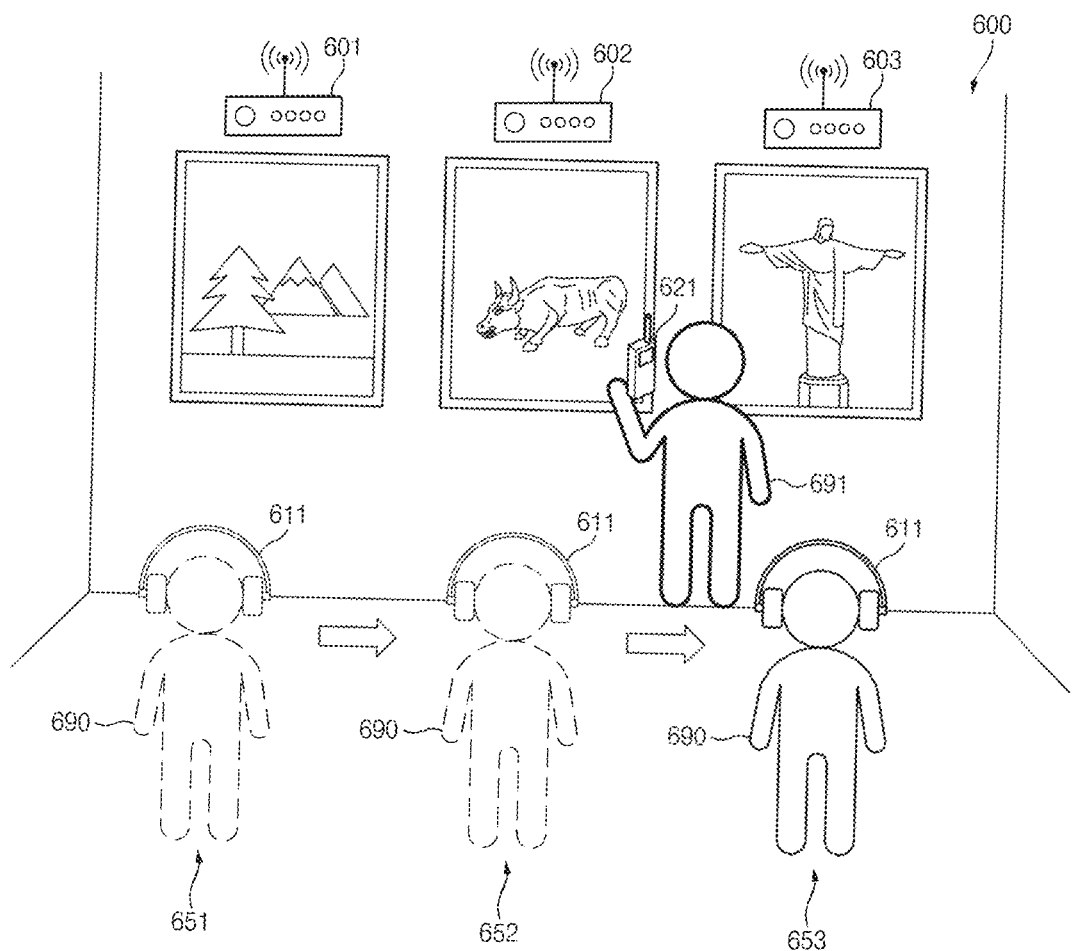
FIG. 6 illustrates link sharing between electronic devices, according to an embodiment.

FIG. 6 illustrates link sharing between electronic devices, according to an embodiment.

For example, a network environment 600 of FIG. 6 may correspond to the network environment of a museum or an art gallery. According to an embodiment, each of a first guide device 601, a second guide device 602, and a third guide device 603 may be an electronic device corresponding to the first electronic device 201 of FIGS. 2A and 2B. For example, each of the first guide device 601, the second guide device 602, and the third guide device 603 may be a device configured to provide a headset 611 with the description of the associated work of art. Each of the first guide device 601, the second guide device 602, and the third guide device 603 may be connected to each other, over a wired or wireless network. For example, the headset 611 may correspond to the first external electronic device 211 of FIGS. 2A and 2B.

According to an embodiment, at a location 651, a user 690 may listen to the description of the work of art, which is associated with the first guide device 601, via the headset 611 connected to the first guide device 601. For example, the headset 611 may be communicatively connected to the first guide device 601, based on a specified wireless connection manner (e.g., Bluetooth or BLE).

According to an embodiment, when the first guide device 601 is connected to the headset 611, the first guide device 601 may transmit the connection information about the connection between the first guide device 601 and the headset 611, to the second guide device 602 and the third guide device 603 via a wired network or a wireless network. For example, the second guide device 602 and the third guide device 603 may listen to the communication between the first guide device 601 and the headset 611, using the received connection information.

According to an embodiment, as the user 690 moves to a location 652, the first guide device 601 may hand over the authority for the connection between the first guide device 601 and the headset 611 to the second guide device 602. For example, the first guide device 601 may perform the empowerment based on at least one of the communication state with the headset 611, an empowerment request, a user input, or the location of the user 690. For example, when the communication state (e.g., communication quality and/or receiving sensitivity) with the headset 611 is not less than a specified range, the first guide device 601 may hand over the authority for the connection between the first guide device 601 and the headset 611 to the second guide device 602, by transmitting the empowerment to the second guide device 602. For another example, when an empowerment request is received from the second guide device 602, the first guide device 601 may hand over the authority for the connection between the first guide device 601 and the headset 611, to the second guide device 602. For example, when a user input corresponding to the empowerment request is received, the second guide device 602 may transmit the empowerment request of the authority for the connection between the first guide device 601 and the headset 611, to the first guide device 601. For example, when the location of the user 690 of the headset 611 corresponds to a specified location, the first guide device 601 may hand over the authority for the connection between the first guide device 601 and the headset 611, to the second guide device 602. The first guide device 601 may perform the empowerment based on the proximity recognition for the headset 611.

According to an embodiment, at the location 652, the user 690 may listen to the data, which is transmitted from the second guide device 602 as the first guide device 601, using the headset 611. The first guide device 601 may interrupt the data transmission to the headset 611, after the empowerment. According to an embodiment, as the user 690 moves to a location 653, the first guide device 601 may hand over the authority for the link between the first guide device 601 and the headset 611 to the third guide device 603. For example, the first guide device 601 may hand over the authority for the connection between the first guide device 601 and the headset 611, to the third guide device 603 by using the method similar to or the same as the empowerment method for the second guide device 602. At the location 653, the user 690 may listen to the data, which is transmitted from the third guide device 603 as the first guide device 601, using the headset 611.

For example, a guide 691 may provide the description about the displayed pictures, using an external electronic device 621 (e.g. radio). At the location 652, the user 690 may desire to listen to the description of the guide 691 while listening to data from the second guide device 602. According to an embodiment, the headset 611 may request the first guide device 601 to hand over the authority for the connection between the first guide device 601 and the headset 611 to the external electronic device 621. For example, the headset 611 may transmit an empowerment request to the first guide device 601 based on a user input to the headset 611 or the proximity recognition of the external electronic device 621 of the headset 611. When the empowerment request is received, the first guide device 601 may transmit connection information about the connection between the first guide device 601 and the headset 611, to the external electronic device 621. The external electronic device 621 may transmit data to the headset 611 as the first guide device 601, using the received connection information. According to an embodiment, the guide 691 may make a request for the empowerment for the connection between the first guide device 601 and the headset 611 to the first guide device 601, using the external electronic device 621. For example, the external electronic device 621 may transmit the empowerment request to the first guide device 601, based on an input to the external electronic device 621 or the proximity recognition of the external electronic device 621 for the headset 611. When the empowerment request is received, the first guide device 601 may transmit connection information about the connection between the first guide device 601 and the headset 611, to the external electronic device 621. The external electronic device 621 may transmit data to the headset 611 as the first guide device 601, using the received connection information.

At the location 652, as described above, the empowerment to the external electronic device 621 may be performed during the empowerment for the second guide device 602. According to an embodiment, during the empowerment for the second guide device 602, when the empowerment to the external electronic device 621 is performed, the first guide device 601 may instruct the second guide device 602 to terminate the empowerment or to terminate the data transmission using the connection between the first guide device 601 and the headset 611. According to an embodiment, as described above with reference to FIGS. 2A and/or 2B, the empowerment to the external electronic device 621 may be terminated. When the empowerment to the external electronic device 621 is terminated, the first guide device 601 may perform the empowerment to the second guide device 602 having the authority before the empowerment to the external electronic device 621. For example, when the empowerment for the same device (e.g., the headset 611) is performed again, the second guide device 602 may transmit data to the headset 611 as the first guide device 601 from the start of specified data or from a portion corresponding to the instant at which the previous empowerment of the specified data is terminated.

Figure 7:
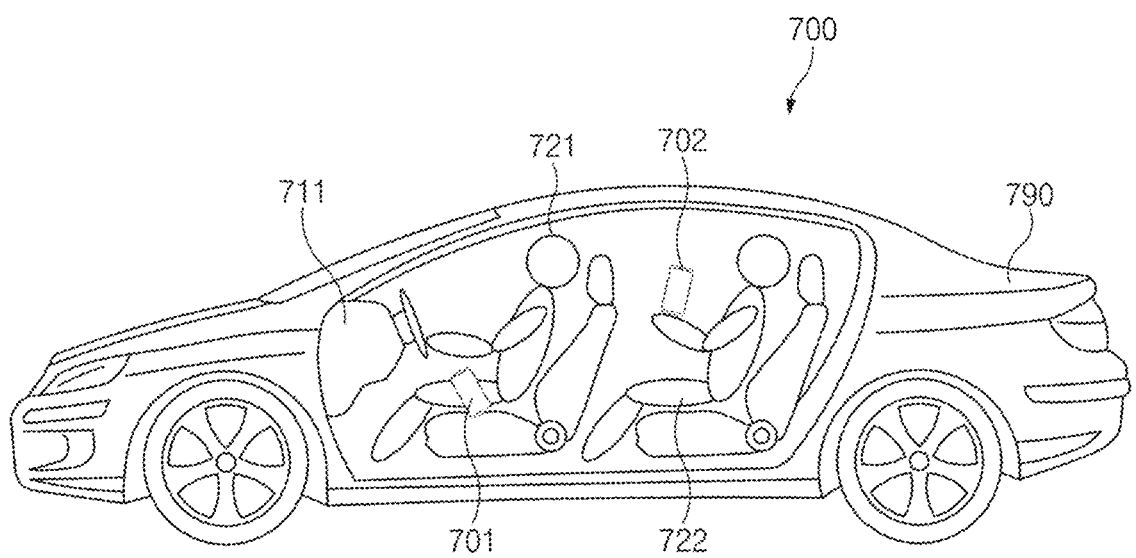
FIG. 7 illustrates link sharing between electronic devices, according to an embodiment.

FIG. 7 illustrates link sharing between electronic devices, according to an embodiment.

In a network environment 700 of FIG. 7, a vehicle 790 may include a car kit 711 capable of being connected to another electronic device. A first user 721 may be the user of a first electronic device 701; a second user 722 may be the user of a second electronic device 702. For example, the first electronic device 701 and the second electronic device 702 may be an electronic device having a structure similar to that of the electronic device 101 of FIG. 1.

For example, the first electronic device 701 may be in a state where the first electronic device 701 is connected to the car kit 711; the second user 722 may desire to connect the second electronic device 702 to the car kit 711. For example, the second user 722 may desire to play the music stored in the second electronic device 702, using the car kit 711. In this case, the connection of the first electronic device 701 may be disconnected; the connection (e.g., pairing) between the second electronic device 702 and the car kit 711 may need to be performed. For example, it may be difficult for the first user 721 to perform the disconnection procedure of the first electronic device 701 due to the driving of the vehicle 790; it may be difficult for the second user 722 to access the car kit 711.

According to various embodiments, the first electronic device 701 may hand over the authority for the connection between the first electronic device 701 and the car kit 711 to the second electronic device 702.

According to an embodiment, the second user 722 may transmit an empowerment request for the connection between the first electronic device 701 and the car kit 711 to the first electronic device 701, using the second electronic device 702. For example, the second electronic device 702 may receive connection information about the connection between the first electronic device 701 and the car kit 711 from the first electronic device 701 and may provide the second user 722 with the UI for the empowerment request, using the connection information. The second electronic device 702 may transmit the empowerment request to the first electronic device 701 based on a user input. For example, when an input to approve the empowerment request is received by the first electronic device 701, the first electronic device 701 may transmit the empowerment information to the second electronic device 702. The second electronic device 702 may transmit data to the car kit 711 as the first electronic device 701, using the empowerment information. For example, the second electronic device 702 may play media, using the car kit 711 by transmitting data including media data such as music to the car kit 711.

According to various embodiments, the first electronic device 701 may terminate the empowerment for the connection between the first electronic device 701 and the car kit 711, based on a specified event. According to an embodiment, during the empowerment to the second electronic device 702, when a user input to the first electronic device 701 or a specified event (e.g., receiving a call) occurs, the first electronic device 701 may transmit the data (e.g., an empowerment return signal) indicating empowerment termination to the second electronic device 702. When the empowerment termination is indicated, the second electronic device 702 may interrupt the data transmission, using the connection between the first electronic device 701 and the car kit 711. For example, after the termination of the empowerment, the first electronic device 701 may communicate with the car kit 711, using the connection between the first electronic device 701 and the car kit 711. For example, the first electronic device 701 may respond to the received call, using the car kit 711. According to an embodiment, after the termination of the call, the first electronic device 701 may transmit the empowerment request for the communication connection to the car kit 711 to the second electronic device 702.

Figure 8:
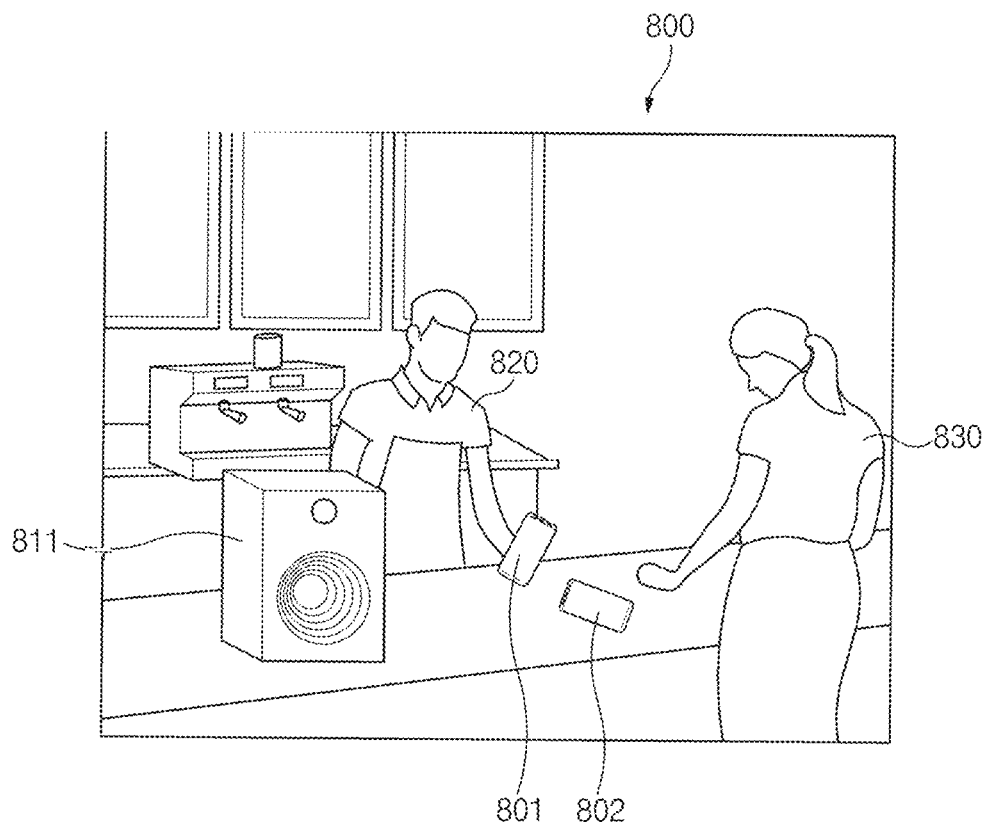
FIG. 8 illustrates temporary link sharing between electronic devices, according to an embodiment.

FIG. 8 illustrates temporary connection sharing 800 between electronic devices, according to an embodiment.

Referring to FIG. 8, a first electronic device 801 may be an electronic device connected to a speaker 811. For example, the first electronic device 801 may be a device that controls connection sharing for another electronic device (e.g., a second electronic device 802), using the connection to the speaker 811. For example, an employee 820 of café may share the connection authority for the speaker 811 positioned at the café using the first electronic device 801 with an electronic device (e.g., the second electronic device 802) of a customer 830 through the empowerment.

According to various embodiments, the first electronic device 801 may hand over the authority for the connection between the speaker 811 and the first electronic device 801, to the second electronic device 802. For example, the second electronic device 802 may output the music played by the second electronic device 802 to the speaker 811 as the first electronic device 801, using the connection between the first electronic device 801 and the speaker 811.

According to various embodiments, the first electronic device 801 may transmit the signal including temporary empowerment information to the second electronic device 802. For example, when the empowerment information is received, the second electronic device 802 may output music during the period indicated by the empowerment information, using the speaker 811. For example, the second electronic device 802 may output the specified number of songs (e.g., three songs), using the speaker 811.

According to an embodiment, the empowerment information may include information (e.g., empowerment start time, the number of songs for which the empowerment is allowed, empowerment termination time, and/or empowerment time interval) about a period in which the empowerment is allowed.

According to an embodiment, the empowerment information may include information (e.g., priority and/or sequence) about the order in which the empowerment will be performed and empowerment period information. For example, the second electronic device 802 may receive connection information about the connection between the first electronic device 801 and the speaker 811 received from the first electronic device 801 and may listen to the data transmission of another electronic device for the speaker 811, using the received connection information. For example, the second electronic device 802 may determine whether the empowerment order of the second electronic device 802 is reached, based on the data transmission, to which the second electronic device 802 has listened. When reaching the empowerment order of the second electronic device 802, the second electronic device 802 may output music during the time interval indicated by the empowerment period information, using the speaker 811.

According to an embodiment, the empowerment information may include one-time key for the empowerment. For example, the second electronic device 802 may output music to the speaker 811 as the first electronic device 801, using the one-time key. For example, the one-time key may be valid during a specified time and may be invalid after the specified time. When the empowerment is terminated, the second electronic device 802 may discard the one-time key, the empowerment information, and/or connection information between the first electronic device 801 and the speaker 811.

According to an embodiment, the first electronic device 801 may perform the empowerment to the second electronic device 802 based on information about the connection between the first electronic device 801 and the speaker 811, when the second electronic device 802 accesses a specified access point, when the second electronic device 802 executes a specified application, when a specified user input is received by the first electronic device 801, and/or when NFC tagging between the first electronic device 801 and the second electronic device 802 is performed.

According to an embodiment, when temporary empowerment is terminated, the second electronic device 802 may return the authority for the connection to the first electronic device 801. For example, when the empowerment period indicated by empowerment information is terminated, the second electronic device 802 may transmit information (e.g., an empowerment return signal) indicating the termination of the empowerment, to the first electronic device 801. According to an embodiment, when the temporary empowerment is terminated, the first electronic device 801 may terminate the empowerment for the link. For example, the first electronic device 801 may transmit information (e.g., an empowerment return request) indicating the termination of the empowerment to the second electronic device 802, when the empowerment period indicated by the empowerment information is terminated or based on a user input to the first electronic device 801.

Figure 9:
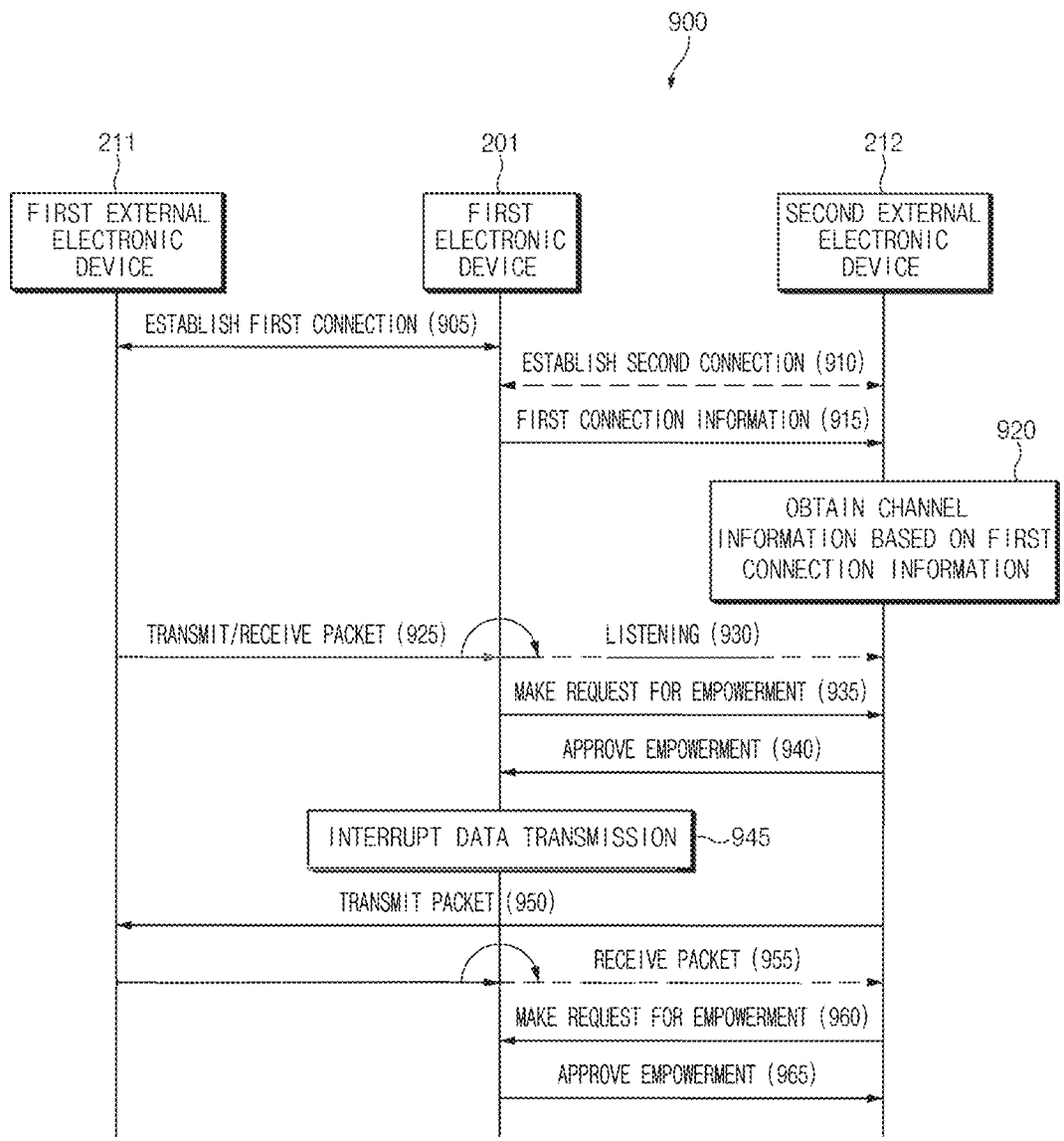
FIG. 9 illustrates a flowchart of a link sharing method, according to various embodiments.

FIG. 9 illustrates a flowchart of a link sharing method 900, according to various embodiments.

According to various embodiments, in operation 905, the first electronic device 201 may establish a first connection to the first external electronic device 211. For example, the first electronic device 201 may establish the first connection by performing pairing with the first external electronic device 211 depending on the Bluetooth communication standard.

According to various embodiments, in operation 910, the first electronic device 201 may establish a second connection to the second external electronic device 212. For example, the first electronic device 201 may establish the second connection by performing pairing with the second external electronic device 212 depending on the Bluetooth communication standard. For another example, the first electronic device 201 may establish the second connection via various wired/wireless connections. According to an embodiment, operation 910 may be performed prior to operation 905. For example, the first electronic device 201 and the second external electronic device 212 may indirectly communicate via an external server, as an electronic device belonging to the same user account or the same user account group. For example, the first electronic device 201 may establish the second connection to the second external electronic device 212 based on an input to the electronic device connection UI 410 of FIG. 4A.

According to an embodiment, operation 910 may be skipped. For example, the first electronic device 201 may perform connectionless communication (e.g., NAN communication) with the second external electronic device 212. In this case, the first electronic device 201 may transmit (e.g., operation 915) first connection information to the second external electronic device 212 without establishing a separate connection.

According to various embodiments, in operation 915, the first electronic device 201 may transmit the first connection information (e.g., information about the connection to the first external electronic device 211) to the second external electronic device 212. For example, the first electronic device 201 may transmit the first connection information to the second external electronic device 212, based on a user input, an event at the first electronic device 201, a request of the first external electronic device 211 or the second external electronic device 212, or the occurrence of an event at the first external electronic device 211. For example, the first connection information may include information for tracking the channel hopping between the first electronic device 201 and the first external electronic device 211. For example, the first connection information may include at least one of address information of the first external electronic device 211 or the first electronic device 201, frequency hop synchronized packet information, link key information, used channel map information, and/or SDP information. The example of information included in the connection information may be referred by the description of the connection information described above with reference to FIGS. 2A and/or 2B.

According to various embodiments, in operation 920, the second external electronic device 212 may obtain channel information between the first electronic device 201 and the first external electronic device 211 based on the received first connection information. For example, the second external electronic device 212 may obtain the channel information by estimating a hopping channel based on the received first connection information.

According to various embodiments, in operation 925, the first electronic device 201 and the first external electronic device 211 may perform packet transmission/reception via the first connection. In operation 930, the second external electronic device 212 may listen to packet transmission/reception between the first electronic device 201 and the first external electronic device 211, using the obtained channel information.

According to various embodiments, in operation 935, the second external electronic device 212 may transmit an empowerment request to the first electronic device 201. In operation 940, the first electronic device 201 may transmit empowerment approval to the second external electronic device 212, and thus the authority for a first connection may be handed over to the second external electronic device 212. For example, the second external electronic device 212 may transmit the empowerment request based on at least one of a user input, the occurrence of a specified event at the second external electronic device 212, a communication state, or the occurrence of an event at the first external electronic device 211. For example, the second external electronic device 212 may provide the UI similar to the empowerment request UI 440 of FIG. 4D and may transmit the empowerment request to the first electronic device 201 based on a user input.

An embodiment is exemplified in FIG. 9 as the first electronic device 201 transmits the empowerment request. However, according to an embodiment, the first electronic device 201 may transmit the empowerment request and the second external electronic device 212 may transmit empowerment approval. For example, the first electronic device 201 may transmit the empowerment request based on an input to the empowerment UI 420 of FIG. 4B. For example, when the empowerment approval is received, the first electronic device 201 may display an empowerment state via the UI such as the state UI 430 of FIG. 4C.

According to various embodiments, in operation 945, the first electronic device 201 may interrupt the data transmission to the first external electronic device 211.

According to various embodiments, in operation 950, the second external electronic device 212 may transmit a packet to the first external electronic device 211 via the first connection, using the authority of the first electronic device 201. For example, the packet may include the access code generated based on first connection information. According to an embodiment, the first electronic device 201 may listen to the packet transmitted by the second external electronic device 212.

According to various embodiments, in operation 955, the second external electronic device 212 may receive the packet transmitted from the first external electronic device 211. For example, the second external electronic device 212 may receive the packet from the first external electronic device 211, by listening to the transmitted packet to the first electronic device 201.

According to various embodiments, in operation 960, the first electronic device 201 may transmit the empowerment request to the second external electronic device 212. For example, the first electronic device 201 may transmit the empowerment request based on at least one of a user input, the occurrence of a specified event at the first electronic device 201, a communication state, the expiration of an empowerment period, or the occurrence of an event at the first external electronic device 211. For example, the first electronic device 201 may provide the UI similar to the state UI 430 of FIG. 4C and may transmit the empowerment request based on a user input. In operation 965, the second external electronic device 212 may transmit empowerment approval and thus the empowerment may be terminated or returned.

An embodiment is exemplified in FIG. 9 as the first electronic device 201 transmits the empowerment request to terminate the empowerment. However, according to an embodiment, the second external electronic device 212 may transmit an empowerment return request and the first electronic device 201 may transmit empowerment approval.

Figure 10:
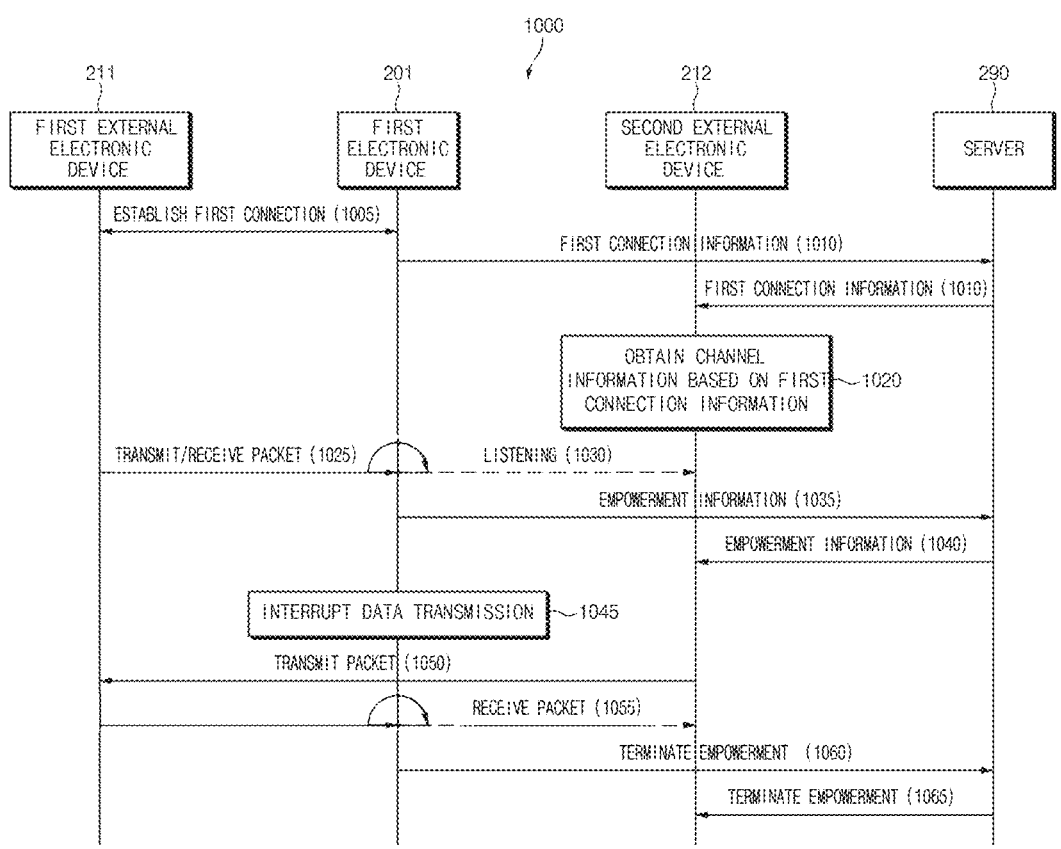
FIG. 10 illustrates a flowchart of a link sharing method, according to various embodiments.

FIG. 10 illustrates a flowchart of a link sharing method 1000, according to various embodiments.

According to various embodiments, in operation 1005, the first electronic device 201 may establish a first connection to the first external electronic device 211. For example, the first electronic device 201 may establish the first connection by performing pairing with the first external electronic device 211 depending on the Bluetooth communication standard.

According to an embodiment, the second external electronic device 212 may communicate with the first electronic device 201 wired or wirelessly. For example, the second external electronic device 212 and the first electronic device 201 may communicate, using connection-based communication or connectionless communication. According to an embodiment, the second external electronic device 212 may communicate with the first electronic device 201 via the server 290. For example, the second external electronic device 212 and the first electronic device 201 may not perform wired/wireless communication but may perform indirect communication via the server 290. Hereinafter, an embodiment is exemplified as the communication between the first electronic device 201 and the second external electronic device 212 is the communication via the server 290. However, an embodiment of the disclosure is not limited thereto. As described above with reference to FIG. 9, the first electronic device 201 and the second external electronic device 212 may perform direct communication without going through the server 290.

According to various embodiments, in operation 1010, the first electronic device 201 may transmit the first connection information (e.g., information about the connection to the first external electronic device 211) to the server 290. For example, the first electronic device 201 may transmit the first connection information to the server 290, based on a user input, an event at the first electronic device 201, a request of the first external electronic device 211 or the second external electronic device 212, or the occurrence of an event at the first external electronic device 211. For example, the first connection information may include information for tracking the channel hopping between the first electronic device 201 and the first external electronic device 211. For example, the first connection information may include at least one of address information of the first external electronic device 211 or the first electronic device 201, frequency hop synchronized packet information, link key information, used channel map information, and/or SDP information. The example of information included in the connection information may be referred by the description of the connection information described above with reference to FIGS. 2A and/or 2B.

According to various embodiments, in operation 1015, the server 290 may transmit the first connection information to the second external electronic device 212. For example, when the second external electronic device 212 satisfies a specified condition, the server 290 may transmit first connection information to the second external electronic device 212. For example, when the second external electronic device 212 belongs to a user account or a user account group, which is the same as the user account of the first electronic device 201, the server 290 may transmit the first connection information to the second external electronic device 212. For another example, when the second external electronic device 212 is positioned within a specified distance from the first external electronic device 211, the server 290 may transmit the first connection information to the second external electronic device 212.

According to various embodiments, in operation 1020, the second external electronic device 212 may obtain channel information between the first electronic device 201 and the first external electronic device 211 based on the received first connection information. For example, the second external electronic device 212 may obtain communication channel information between the first electronic device 201 and the first external electronic device 211, by estimating a hopping channel based on the received first connection information.

According to various embodiments, in operation 1025, the first electronic device 201 and the first external electronic device 211 may perform packet transmission/reception via the first connection. In operation 1030, the second external electronic device 212 may listen to packet transmission/reception between the first electronic device 201 and the first external electronic device 211, using the obtained channel information.

According to various embodiments, in operation 1035, the first electronic device 201 may transmit empowerment information to the server 290. For example, when the empowerment request from the second external electronic device 212 is received or when the empowerment approval is received from the second external electronic device 212, the first electronic device 201 may transmit the empowerment information to the server 290. For example, the first electronic device 201 may transmit the empowerment information based on at least one of a user input, the occurrence of a specified event at the first electronic device 201, a communication state, or the occurrence of an event at the first external electronic device 211. For example, the first electronic device 201 may transmit the empowerment information based on an input to the empowerment UI 420 of FIG. 4B. For example, the empowerment information may include information indicating the approval of the empowerment.

According to various embodiments, in operation 1040, the server 290 may transmit the empowerment information to the second external electronic device 212.

According to various embodiments, in operation 1045, the first electronic device 201 may interrupt data transmission. For example, when the response to the empowerment approval is received from the second external electronic device 212 directly or via the server 290 in response to the transmission (e.g., operation 1040) of the empowerment information, the first electronic device 201 may interrupt the data transmission. According to an embodiment, after operation 1035, the first electronic device 201 may interrupt the data transmission.

According to various embodiments, in operation 1050, the second external electronic device 212 may transmit a packet to the first external electronic device 211 via the first connection, using the authority of the first electronic device 201. For example, the packet may include the access code generated based on first connection information. According to an embodiment, the first electronic device 201 may listen to the packet transmitted to the first external electronic device 211 by the second external electronic device 212.

According to various embodiments, in operation 1055, the second external electronic device 212 may receive the packet transmitted from the first external electronic device 211. For example, the second external electronic device 212 may receive the packet from the first external electronic device 211, by listening to the transmitted packet to the first electronic device 201.

According to various embodiments, in operation 1060, the first electronic device 201 may transmit information indicating empowerment termination, to the server 290. For example, the first electronic device 201 may transmit information indicating empowerment termination of the second external electronic device 212 to the server 290, based on at least one of a user input, the occurrence of a specified event at the first electronic device 201, a communication state, or the expiration of an empowerment period. For example, the first electronic device 201 may provide the state UI 430 of FIG. 4C and may transmit empowerment termination based on a user input to the state UI 430.

In operation 1065, the server 290 may transmit information indicating empowerment termination to the second external electronic device 212. The second external electronic device 212 may interrupt the data transmission using the first connection depending on the empowerment termination.

An embodiment is exemplified in FIG. 10 as the first electronic device 201 transmits information indicating empowerment termination to terminate the empowerment. However, according to an embodiment, the second external electronic device 212 may transmit the information indicating empowerment termination to the server 290.

Figure 11:
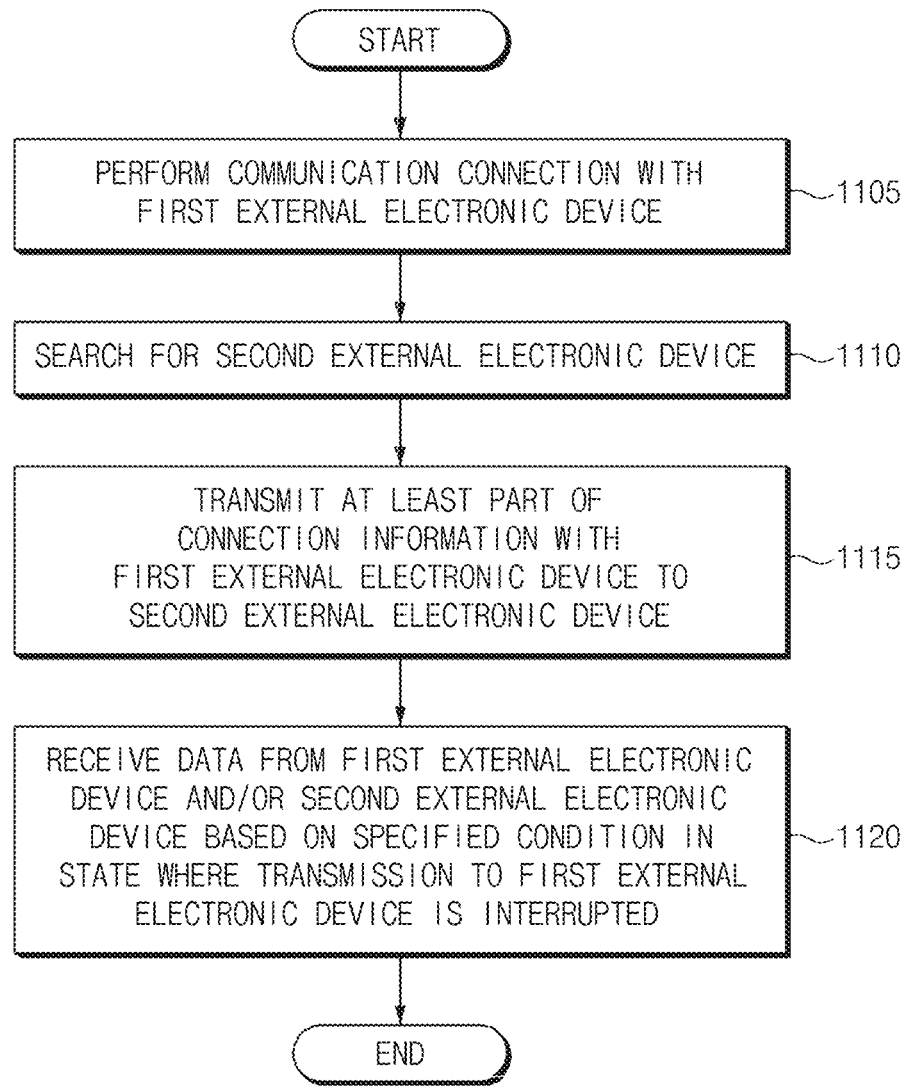
FIG. 11 illustrates a flowchart of a link sharing method by the paired electronic device, according to various embodiments.

FIG. 11 illustrates a flowchart of a link sharing method by the paired electronic device, according to various embodiments.

According to various embodiments, an electronic device (e.g., the first electronic device 201 of FIGS. 2A and 2B) may include a user interface (e.g., a display (e.g., the display device 160 of FIG. 1), the input device 150 of FIG. 1, the audio module 170 of FIG. 1, the sensor module 176 of FIG. 1, the interface 177 of FIG. 1, the haptic module 179 of FIG. 1, and/or the camera module 180 of FIG. 1), at least one wireless communication circuit (e.g., the communication module 190 of FIG. 1) for performing wireless communication with at least one external electronic device, a processor (e.g., the processor 120 of FIG. 1) operatively connected to the user interface and the wireless communication circuit, and a memory (e.g., the memory 130 of FIG. 1) operatively connected to the processor. According to an embodiment, the memory may store instructions that, when executed, cause the processor to perform the operation of the electronic device to be described.

According to various embodiments, in operation 1105, an electronic device may perform communication connection with a first external electronic device (e.g., the first external electronic device 211 of FIGS. 2A and 2B) through a wireless communication circuit and may transmit and/or receive data to or from the first external electronic device. For example, the electronic device may perform the connection with the first external electronic device based on a Bluetooth communication standard (e.g., BLE communication standard).

According to various embodiments, in operation 1110, an electronic device may search for a second external electronic device (e.g., the second external electronic device 212 of FIGS. 2A and 2B) positioned at the periphery of the electronic device. For example, the electronic device may search for the second external electronic device, using at least one communication protocol of BLE, Bluetooth, Wi-Fi, NAN, or cellular communication. For example, the second external electronic device may have a user account or a user account group the same as the electronic device. For another example, the electronic device may receive information about the second external electronic device via a server (e.g., the server 290 of FIG. 2A).

According to various embodiments, in operation 1115, the electronic device may transmit at least part of connection information (e.g., link information) with the first external electronic device to the second external electronic device through a wireless communication circuit. For example, the connection information may include at least part of the Bluetooth address of the first external electronic device, FHS packet information, an LT address, a piconet clock, a link key, used channel map information, or SDP information. For example, the connection information may include at least one of empowerment start time information or empowerment time interval information. For example, the electronic device may transmit connection information, using a short range wireless communication (e.g., WLAN, inter-device communication, NFC, NAN communication, Bluetooth, or BLE). For another example, the electronic device may transmit connection information to the second external electronic device via the server (e.g., the server 290 of FIG. 2A).

According to various embodiments, in operation 1120, the electronic device may receive data from the first external electronic device and/or the second external electronic device, based on the specified condition in a state where the transmission to the first external electronic device is interrupted. For example, the specified condition may include at least one of the occurrence of an event at the electronic device, the request of the first external electronic device, or the occurrence of an event at the first external electronic device. For example, in operation 1120, the second external electronic device may transmit data to the first external electronic device as the electronic device, using the connection between the electronic device and the first external electronic device. The second external electronic device may listen to the data, which is transmitted by the first external electronic device to the electronic device, using the connection information between the electronic device and the first external electronic device. Accordingly, the data transmitted by the first external electronic device to the electronic device may be received by the second external electronic device.

Figure 12:
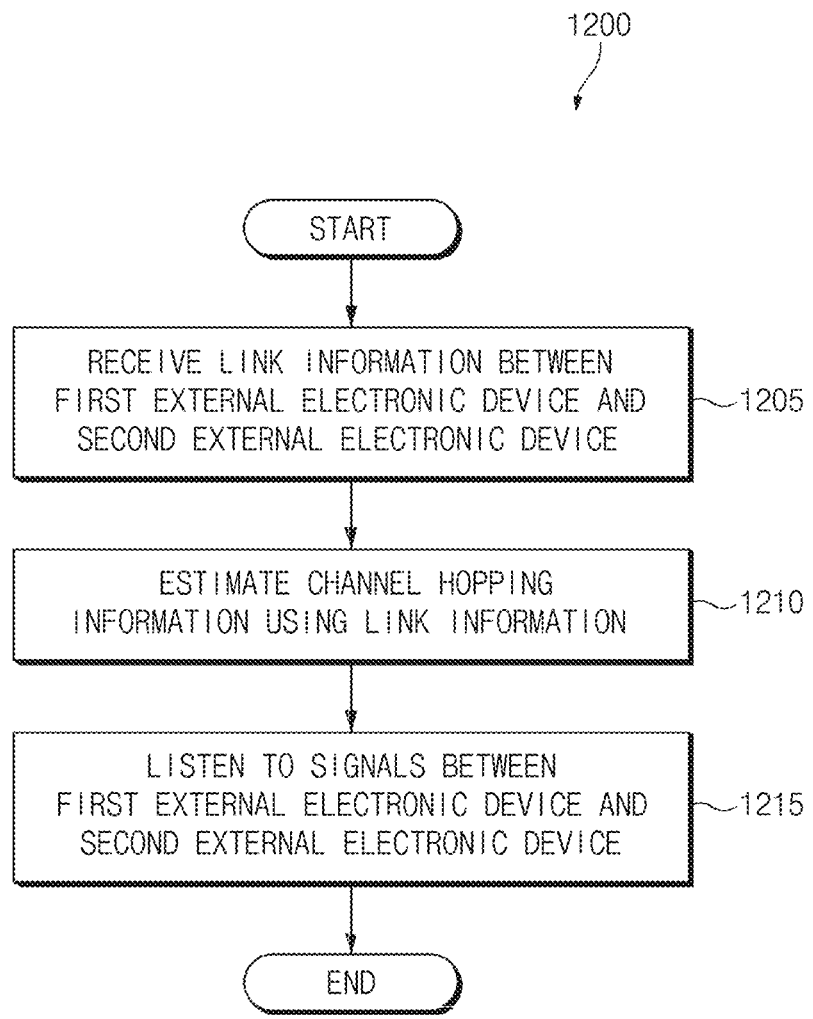
FIG. 12 illustrates a flowchart of a link sharing method by the unpaired electronic device, according to various embodiments.

FIG. 12 illustrates a flowchart of a link sharing method 1200 by the unpaired electronic device, according to various embodiments.

According to various embodiments, in operation 1205, an electronic device (e.g., the second external electronic device 212 of FIGS. 2A and 2B) may receive link information between a first external electronic device (e.g., the first electronic device 201 of FIGS. 2A and 2B) and a second external electronic device (e.g., the first external electronic device 211 of FIGS. 2A and 2B) from the first external electronic device. According to an embodiment, the electronic device may be paired with the first external electronic device based on a Bluetooth protocol and may receive the link information between the first external electronic device and the second external electronic device through a link manager message. According to an embodiment, the electronic device may belong to a user account or a user account group, which is the same as the first external electronic device. According to an embodiment, the electronic device may receive the link information from the first external electronic device, directly or via an external server.

According to an embodiment, the link information may include at least one of address information of the second external electronic device, frequency hop synchronized packet information, link key information, used channel map information, or SDP information.

According to various embodiments, in operation 1210, the electronic device may estimate channel hopping information between the first external electronic device and the second external electronic device, using the received link information.

According to various embodiments, in operation 1215, the electronic device may listen to signals between the first external electronic device and the second external electronic device, using the estimated channel hopping information.

According to an embodiment, the electronic device may transmit an empowerment request to the first external electronic device; when receiving an empowerment approval response from the first external electronic device, the electronic device may generate a packet, using the link information. The electronic device may transmit the generated packet to the second external electronic device without the pairing with the second external electronic device. For example, when the strength of the signal received from the second external electronic device is not less than a specified range, the electronic device may transmit an empowerment request to the first external electronic device. For example, the empowerment approval response may include at least one of empowerment start time information or empowerment time interval information.

Figure 13:
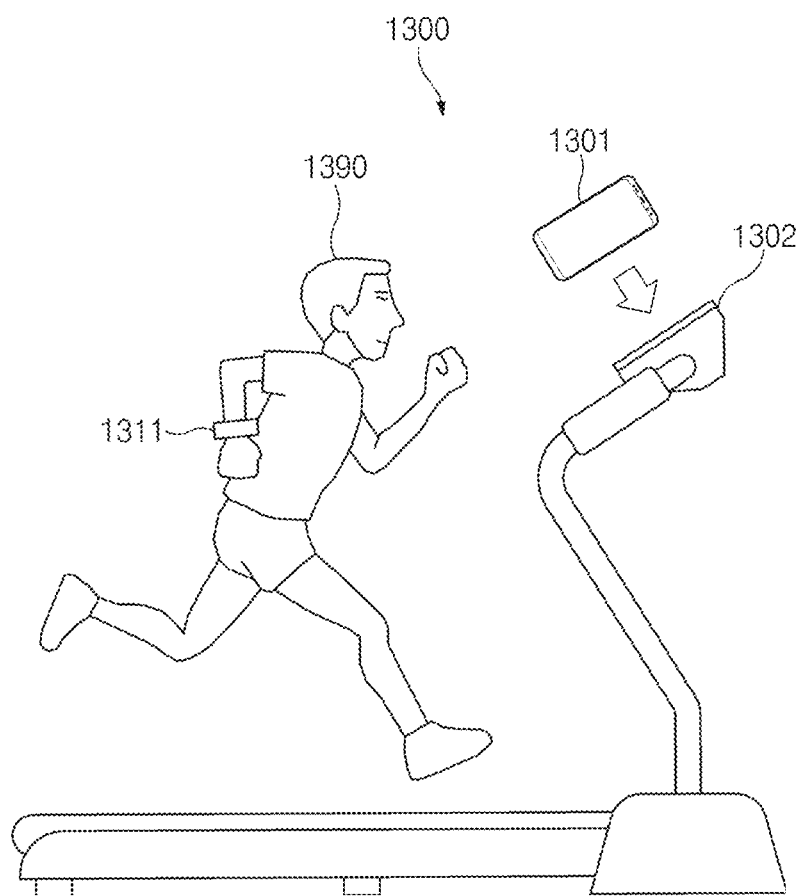
FIG. 13 illustrates data sharing of an external electronic device, according to an embodiment.

FIG. 13 illustrates data sharing of an external electronic device, according to an embodiment.

Referring to FIG. 13, in an exercise environment 1300, a user 1390 may exercise, using a treadmill 1302 (e.g., the second external electronic device 212 of FIGS. 2A and 2B). For example, the user 1390 may be the user of a mobile phone 1301 (e.g., the first electronic device 201 of FIGS. 2A and 2B) and may exercise while wearing a wearable device 1311 (e.g., the first external electronic device 211 of FIGS. 2A and 2B). For example, the wearable device 1311 may be connected to the mobile phone 1301 and may obtain the biometric information (e.g., heart rate information) of the user 1390 to transmit the biometric information to the mobile phone 1301.

For example, the user 1390 may desire to identify his or her biometric information during the exercise. Because it is difficult for the user 1390 to manipulate the mobile phone 1301, the user 1390 may allow the treadmill 1302 to listen to the link between the mobile phone 1301 and the wearable device 1311 through the above-described method.

According to various embodiments, the user 1390 may transmit link information between the mobile phone 1301 and the wearable device 1311 to the treadmill 1302 by positioning the mobile phone 1301 at the specified location of the treadmill 1302. For example, the user 1390 may perform NFC tagging by positioning the mobile phone 1301 at the specified location of the treadmill 1302. When the NFC tagging is performed, the mobile phone 1301 may transmit link information between the mobile phone 1301 and the wearable device 1311 to the treadmill 1302. For another example, when the user 1390 positions the mobile phone 1301 at the specified location of the treadmill 1302, the mobile phone 1301 may detect an electromagnetic field corresponding to the treadmill 1302. When the electromagnetic field corresponding to the treadmill 1302 is detected, the mobile phone 1301 may transmit link information between the mobile phone 1301 and the wearable device 1311 to the treadmill 1302.

According to an embodiment, when the user state detected by the wearable device 1311 is not less than a specified range, the mobile phone 1301 may transmit the link information between the mobile phone 1301 and the wearable device 1311 to the treadmill 1302. For example, when the user state detected by the wearable device 1311 is not less than a specified heart rate and the wearable device 1311 is detected by the mobile phone 1301, the mobile phone 1301 may transmit link information between the mobile phone 1301 and the wearable device 1311 to the treadmill 1302. For example, when the user state detected by the wearable device 1311 is maintained in a specified range or more during a specified time or more, the mobile phone 1301 may transmit the link information between the mobile phone 1301 and the wearable device 1311 to the treadmill 1302.

According to an embodiment, the mobile phone 1301 may transmit the link information between the mobile phone 1301 and the wearable device 1311 to the treadmill 1302 based on the user state detected by the wearable device 1311. For example, when the user's body state detected by the wearable device 1311 corresponds to a specified abnormal state (e.g., the heart rate of a specified range or more, irregular heart rate, and/or the heart rate of a specified range or less), the mobile phone 1301 may transmit the link information between the mobile phone 1301 and the wearable device 1311 to the treadmill 1302.

According to an embodiment, the treadmill 1302 receiving the link information may listen to biometric information transmitted to the mobile phone 1301 by the wearable device 1311 and may display the biometric information on the display of the treadmill 1302.

According to an embodiment, when the biometric information, to which the treadmill 1302 listens using the link information between the mobile phone 1301 and the wearable device 1311, corresponds to a specified condition, the treadmill 1302 may perform a specified operation. For example, when the biometric information indicates an abnormal state (e.g., the heart rate of a specified range or more, irregular heart rate, and/or the heart rate of a specified range or less), the treadmill 1302 may perform operation stop and/or alarm provision.

According to an embodiment, the treadmill 1302 may interrupt the listening based on a specified condition. For example, the listening may be interrupted, when the mobile phone 1301 is not detected, when the exercise program set for the treadmill 1302 is terminated, or when the operation (e.g., running program or state) of the treadmill 1302 is interrupted by the user 1390. According to various embodiments, an electronic device (e.g., the first electronic device 201 of FIGS. 2A and 2B) may include a user interface (e.g., the input device 150 and/or the display device 160 of FIG. 1), at least one wireless communication circuit (e.g., the communication module 190 of FIG. 1) performing wireless communication with at least one external electronic device (e.g., the first external electronic device 211, the second external electronic device 212, and/or the server 290 of FIGS. 2A and 2B), a processor (e.g., the processor 120 of FIG. 1) operatively connected to the user interface and the wireless communication circuit, and a memory (e.g., the memory 130 of FIG. 1) operatively connected to the processor. The memory may store instructions that, when executed, cause the processor to perform communication connection with a first external electronic device (e.g., the first external electronic device 211 of FIGS. 2A and 2B) through the wireless communication circuit to transmit and/or receive data, to search for a second external electronic device (e.g., the second external electronic device 212 of FIGS. 2A and 2B) positioned at a periphery of the electronic device, to transmit at least part of connection information with the first external electronic device to the second external electronic device through the wireless communication circuit, and to receive data from the first external electronic device and/or the second external electronic device based on a user input via the user interface, an occurrence of an event at the electronic device, a request of the first external electronic device, or an occurrence of an event at the first external electronic device, in a state where data transmission to the first external electronic device is interrupted.

According to an embodiment, the instructions may cause the processor to use a Bluetooth low energy (BLE) protocol in the performing of the communication connection with the first external electronic device and to use at least one communication protocol of BLE, Bluetooth, wireless fidelity (Wi-Fi), neighbor awareness networking (NAN), or cellular communication, in the searching for the second external electronic device.

According to an embodiment, the connection information may include at least part of a Bluetooth address of the first external electronic device, frequency hop synchronization (FHS) packet information, a logical transport (LT) address, a piconet clock, a link key, used channel map information, or service discovery protocol (SDP) information.

According to an embodiment, the second external electronic device may have a user account or a group account the same as the electronic device.

According to an embodiment, the connection information may include at least one of empowerment start time information or empowerment time interval information.

According to various embodiments, an electronic device (e.g., the first electronic device 201 of FIGS. 2A and 2B) may include at least one communication circuit (e.g., the communication module 190 of FIG. 1), a processor (e.g., the processor 120 of FIG. 1) operatively connected to the at least one communication circuit and a memory (e.g., the memory 130 of FIG. 1) operatively connected to the processor. The memory may store instructions that, when executed, cause the processor to pair a first external electronic device (e.g., the first external electronic device 211 of FIGS. 2A and 2B) based on a Bluetooth protocol, using the at least one communication circuit and to transmit link information, which is associated with a connection between the electronic device and the first external electronic device and which includes information for tracking channel hopping between the electronic device and the first external electronic device, to a second external electronic device (e.g., the second external electronic device 212 of FIGS. 2A and 2B) using the at least one communication circuit.

According to an embodiment, the instructions may cause the processor to pair the second external electronic device based on the Bluetooth protocol, using the at least one communication circuit and to transmit the link information to the second external electronic device, using a link manager message.

According to an embodiment, the electronic device and the second external electronic device may belong to the same account or the same account group. The instructions may cause the processor to transmit the link information to the second external electronic device, directly or via an external server.

According to an embodiment, the link information may include address information of the first external electronic device, FHS packet information, link key information, used channel map information, and SDP information.

According to an embodiment, when executed, the instructions may cause the processor to transmit an empowerment request to the second external electronic device and to interrupt transmission to the first external electronic device when an empowerment approval response is received from the second external electronic device.

According to an embodiment, the empowerment request may include at least one of empowerment start time information or empowerment time interval information.

According to an embodiment, when executed, the instructions may cause the processor to transmit the empowerment request when strength of a reception signal from the first external electronic device is less than a specified range.

According to an embodiment, when executed, the instructions may cause the processor to listen to a signal transmitted from the first external electronic device to the electronic device and a signal transmitted from the second external electronic device to the first external electronic device when the empowerment approval response is received from the second external electronic device.

According to various embodiments, an electronic device (e.g., the first electronic device 201 of FIGS. 2A and 2B) may include at least one communication circuit (e.g., the communication module 190 of FIG. 1), a processor (e.g., the processor 120 of FIG. 1) operatively connected to the at least one communication circuit and a memory (e.g., the memory 130 of FIG. 1) operatively connected to the processor. The memory may store instructions that, when executed, cause the processor to receive link information associated with a connection between a first external electronic device and a second external electronic device from the first external electronic device, using the at least one communication circuit, to estimate channel hopping information between the first external electronic device and the second external electronic device, using the link information, and to listen to signals between the first external electronic device and the second external electronic device, using the estimated channel hopping information.

According to an embodiment, when executed, the instructions may cause the processor to pair the first external electronic device based on a Bluetooth protocol, using the at least one communication circuit. The link information may be included in a link manager message.

According to an embodiment, the electronic device and the first external electronic device may belong to the same account or the same account group. When executed, the instructions may cause the processor to receive the link information from the first external electronic device, directly or via an external server.

According to an embodiment, the link information may include address information of the second external electronic device, FHS packet information, link key information, used channel map information, and SDP information.

According to an embodiment, when executed, the instructions may cause the processor to transmit an empowerment request to the first external electronic device, to generate a packet by using the link information when an empowerment approval response is received from the first external electronic device, and to transmit the generated packet to the second external electronic device without pairing with the second external electronic device.

According to an embodiment, when executed, the instructions may cause the processor to transmit the empowerment request when strength of a signal received from the second external electronic device is not less than a specified range.

According to various embodiments of the disclosure, an electronic device may communicate with an external electronic device without a separate connection procedure, by sharing the link authority of short range communication.

According to various embodiments of the disclosure, the electronic device may provide seamless communication by listening to the communication between external electronic devices.

Besides, a variety of effects directly or indirectly understood through the disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   at least one communication circuit;
   a processor operatively connected to the at least one communication circuit; and
   a memory operatively connected to the processor,
   wherein the memory stores instructions that, when executed, cause the processor to:
      pair a first external electronic device to establish a first connection between the electronic device and the first external electronic device, based on a Bluetooth protocol, using the at least one communication circuit;
      transmit link information, which is associated with the first connection between the electronic device and the first external electronic device and which includes information for tracking channel hopping of the first connection between the electronic device and the first external electronic device, to a second external electronic device using the at least one communication circuit;
      receive, from the second external electronic device, an empowerment request for allowing the second external electronic device to transmit, to the first external electronic device, a packet using the first connection;
      in response to receiving the empowerment request, transmit, to the second external electronic device, an empowerment approval response which allows the second external electronic device to transmit, to the first external electronic device using the first connection, a packet including an access code of the electronic device generated based on the link information;
      after transmitting the empowerment approval response, cease transmission of a packet to the first external electronic device using the first connection;
      after ceasing the transmission, transmit another empowerment request to the second external electronic device; and
      when another empowerment approval response according to the other empowerment request is received from the second external electronic device, resume the transmission to the first external electronic device using the first connection, and
   wherein after the electronic device transmits the empowerment approval response to the second external electronic device, the second external electronic device is capable of transmitting a packet to the first external electronic device using the first connection without establishing another connection between the second external electronic device and the first external electronic device.

2. The electronic device of claim 1, wherein the instructions cause the processor to:
pair the second external electronic device based on the Bluetooth protocol, using the at least one communication circuit; and
transmit the link information to the second external electronic device, using a link manager message.

3. The electronic device of claim 1, wherein the electronic device and the second external electronic device belong to a same account or a same account group, and
wherein the instructions cause the processor to:
transmit the link information to the second external electronic device, directly or via an external server.

4. The electronic device of claim 1, wherein the link information includes address information of the first external electronic device, frequency hop synchronization (FHS) packet information, link key information, used channel map information, and service discovery protocol (SDP) information.

5. The electronic device of claim 1, wherein the empowerment request includes at least one of empowerment start time information or empowerment time interval information.

6. The electronic device of claim 1, wherein the instructions, when executed, cause the processor to:
when strength of a reception signal from the first external electronic device is less than a specified range, transmit the other empowerment request.

7. The electronic device of claim 1, wherein the instructions, when executed, cause the processor to:
after transmitting the empowerment approval response to the second external electronic device, listen to a signal transmitted from the first external electronic device to the electronic device and a signal transmitted from the second external electronic device to the first external electronic device.

8. An electronic device comprising:
at least one communication circuit;
a processor operatively connected to the at least one communication circuit; and
a memory operatively connected to the processor,
wherein the memory stores instructions that, when executed, cause the processor to:
receive link information associated with a first connection between a first external electronic device and a second external electronic device from the first external electronic device, using the at least one communication circuit;
estimate channel hopping information of the first connection between the first external electronic device and the second external electronic device, using the link information;
listen to signals between the first external electronic device and the second external electronic device, using the estimated channel hopping information;
transmit, to the first external electronic device, an empowerment request for allowing the electronic device to transmit, to the second external electronic device, a packet using the first connection;
in response to transmitting the empowerment request, receive, from the first external electronic device, an empowerment approval response which allows the electronic device to transmit, to the first external electronic device using the first connection, the packet including an access code of the first external electronic device generated based on the link information;
after receiving the empowerment approval response, transmit the packet to the second external electronic device using the first connection without establishing another connection between the electronic device and the second external electronic device;
after transmitting the packet, receive another empowerment request from the first external electronic device;
in response to receiving the other empowerment request, transmit, to the first external electronic device, another empowerment approval response which allows the first external electronic device to transmit, to the second external electronic device using the first connection, another packet; and
after transmitting the other empowerment approval response, cease transmission of the packet to the second external electronic device using the first connection.

9. The electronic device of claim 8, wherein the instructions, when executed, cause the processor to:
pair the first external electronic device based on a Bluetooth protocol, using the at least one communication circuit, and
wherein the link information is included in a link manager message.

10. The electronic device of claim 8, wherein the electronic device and the first external electronic device belong to a same account or a same account group, and
wherein the instructions, when executed, cause the processor to:
receive the link information from the first external electronic device, directly or via an external server.

* * * * *